US008209676B2

(12) United States Patent
Kapadekar et al.

(10) Patent No.: US 8,209,676 B2
(45) Date of Patent: Jun. 26, 2012

(54) DEVICE MANAGEMENT IN A NETWORK

(75) Inventors: Vivek Kapadekar, San Diego, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1420 days.

(21) Appl. No.: 11/810,575

(22) Filed: Jun. 6, 2007

(65) Prior Publication Data
US 2007/0294385 A1 Dec. 20, 2007

Related U.S. Application Data

(60) Provisional application No. 60/812,376, filed on Jun. 8, 2006.

(51) Int. Cl.
*G06F 9/44* (2006.01)
*G06F 15/16* (2006.01)

(52) U.S. Cl. ........................................ 717/171; 709/203

(58) Field of Classification Search ................... 717/168, 717/169, 171; 709/203, 217
See application file for complete search history.

(56) References Cited

U.S. PATENT DOCUMENTS

| | | | | |
|---|---|---|---|---|
| 5,724,526 A * | 3/1998 | Kunita | ......................... | 704/277 |
| 6,665,376 B1 * | 12/2003 | Brown | ........................... | 379/85 |
| 6,904,405 B2 * | 6/2005 | Suominen | ..................... | 704/235 |
| 8,099,078 B2 * | 1/2012 | Lazaridis | ....................... | 455/408 |
| 2001/0056348 A1 * | 12/2001 | Hyde-Thomson et al. | ... | 704/260 |
| 2005/0039178 A1 * | 2/2005 | Marolia et al. | ................ | 717/168 |
| 2005/0149335 A1 * | 7/2005 | Mesbah et al. | ................ | 704/277 |
| 2005/0182697 A1 | 8/2005 | Rao | | |
| 2005/0239447 A1 * | 10/2005 | Holzman et al. | ............ | 455/414.3 |
| 2006/0089999 A1 * | 4/2006 | Xiang et al. | ................... | 709/229 |
| 2007/0036294 A1 * | 2/2007 | Chaudhuri et al. | ......... | 379/88.16 |
| 2010/0185727 A1 * | 7/2010 | Mittal | ........................... | 709/203 |
| 2011/0022948 A1 * | 1/2011 | Brown et al. | ................. | 715/236 |
| 2011/0209055 A1 * | 8/2011 | Plestid et al. | ................. | 715/265 |

FOREIGN PATENT DOCUMENTS

| | | |
|---|---|---|
| EP | 1515571 | 3/2005 |
| WO | 2004049314 | 6/2004 |
| WO | 2005008940 | 1/2005 |

OTHER PUBLICATIONS

"International Search Report/Written Opinion" for PCT Application PCT/US2007/070534, dated Apr. 10, 2008.
"International Search Report/Written Opinion" for PCT Application PCT/US2007/070534, dated Feb. 7, 2008.

* cited by examiner

*Primary Examiner* — Anna Deng

(57) ABSTRACT

Methods and devices supporting the management of a plurality of electronic devices and processing of update information for updating software and/or firmware in the electronic devices. Prompting of users may be made using a language associated with the electronic device, and authorization to update an electronic device may be secured using a subscriber identity module.

10 Claims, 11 Drawing Sheets

| Identifier: '3F00 / 2F46' | Structure: transparent | Optional |
|---|---|---|
| File Size: 17 bytes | Update activity: low ||
| Access Conditions:<br>    READ              CHV1<br>    UPDATE         ADM<br>    INVALIDATE    ADM<br>    REHABILITATE  ADM |||

| Bytes | Description | M/O | Length |
|---|---|---|---|
| 1 | FOTA Condition | M | 1 byte |
| 2 to 17 | RFU | M | 16 bytes |

Byte 1, FOTA condition:

b1=0: FOTA update not allowed.
b1=1: FOTA update allowed.
RFU
RFU

| Update Package | OPERATOR - SIM | | |
|---|---|---|---|
| | Update Allowed | | Update Not Allowed |
| | Secured | Not secured | |
| OPERATOR – Secured | Ok | No | No |
| OPERATOR – Not Secured | No | No | No |
| Other – Secured | No | No | No |

FIG. 8

| User ID: | Jane Harvey |
|---|---|
| User's Job Name: | Moto-300-update-7 |
| IMEI: | 353388000433719 |
| MSISDN: | 19492250032 |
| Accept Device: | Accept only the expected IMEI |

```
2004.09.27 02:34.045  Task 2256 started FOTA
2004.09.27 02:34.875  Notification sent
2004.09.27 02:42.332  Notification delivered
2004.09.27 02:43.563  OMA DM PKG#1 received
2004.09.27 02:44.246  Device MMV = Motorola V300 Version 2.3
2004.09.27 02:44.856  FW selected = Version 4.2, URL http://DLSrvr2.TMO.com
2004.09.27 02:45.725  OMA DM session ended OK
2004.09.27 02:46.052  OMA DL session started
2004.09.27 02:47.045  OMA DL session ended OK
2004.09.27 03:50.834  Task 2256 completed FOTA
```

DEVICE MANAGEMENT IN A NETWORK

The present application makes reference to U.S. Provisional Application Ser. No. 60/812,376 entitled "DEVICE MANAGEMENT IN A NETWORK", filed Jun. 8, 2006, the complete subject matter of which is hereby incorporated herein by reference, in its entirety.

In addition, the present application makes reference to U.S. Provisional Patent Application Ser. No. 60/688,508. entitled "CUSTOMER CARE NETWORK WITH AUTOMATIC CALLBACK TO SUBSCRIBER", filed Jun. 7, 2005, U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

Non-volatile memory is employed in a wide variety of electronic devices such as, for example, mobile handsets, cellular phones, personal digital assistants (PDA's), pagers and handheld personal computers. The non-volatile memory in these devices contains firmware, application software, data, and configuration information that makes the devices operational, and may be provided by the manufacturers of the electronic devices, by system operators of telecommunication carrier networks, or by third parties developers. If defects are found in such firmware/software, or if new features are to be added to such devices, the software and/or firmware in the affected electronic devices may need to be updated. Errors and/or interruptions that may occur during the updating of such operational code may leave the electronic device in a partly or completely non-functional state. To avoid this problem, present methods of updating such software and/or firmware involve returning the electronic device to the manufacturer, to the system operator, or to the third party, so that an update of memory contents may be performed using a direct connection to the electronic device. This is both costly and inconvenient to both the user of the electronic device, and to one performing the update.

Configuration parameters and other information for an electronic device may be stored in the non-volatile memory of such devices, and information about the device capabilities, the hardware, software and manufacturer of the device, and particulars for a given instance of the device in a network may be stored in databases used by, for example, device management and customer service operations. Such databases may be accessible to device management and customer service operations through database access mechanisms using, for example, structured query language (SQL) or similar database management tools.

Updates to firmware and/or software in an electronic device may be developed by a number of parties including, for example, the manufacturer of the electronic device, the provider of services of a communication network accessed by the electronic device, or a third party. While the manufacturer and/or third party may be technically qualified and capable of creating workable updates for the firmware and/or software in an electronic device, such updated firmware and/or software may not be planned for or compatible with the services and communication capabilities of the communication network of the service provider. Although the user of the electronic device may have authorization to use the network, an update to the firmware/software of the electronic device may not be authorized for use in electronic device served by the communication network of the service provider.

In some circumstances, updates to software/firmware of an electronic device that are approved for distribution may be intended only for use by a subset of those electronic device users. For example, new applications or software and/or firmware updates may provide electronic device capabilities that are intended for use by specific groups of users. Some updates may not yet be fully tested, and there may be a desire to make such updates available to users that have been selected to be testers of an early release of an application or firmware/software update. In other circumstances, such a subset of users may have a common need for an application or update of firmware/software, and distribution to such a subset may be desirable. Limiting the distribution of such updates to a selected group may be necessary and/or prudent, if such updates may cause problems for the users of the affected electronic devices.

Further limitations and disadvantages of conventional and traditional approaches will become apparent to one of skill in the art, through comparison of such systems with a representative embodiment of the present invention as set forth in the remainder of the present application with reference to the drawings.

BRIEF DESCRIPTION OF SEVERAL VIEWS OF THE DRAWINGS

FIG. 8 shows a table illustrating exemplary scenarios regarding the control of the update process for an electronic device that may correspond to, for example, the electronic device of FIG. 1, for an update package secured by System Operator A and those not secured by System Operator A, used with a SIM issued by System Operator A, in accordance with a representative embodiment of the present invention.

FIG. 11 illustrates an exemplary event level details screen, in accordance with a representative embodiment of the present invention.

DETAILED DESCRIPTION OF THE INVENTION

Figure 1:
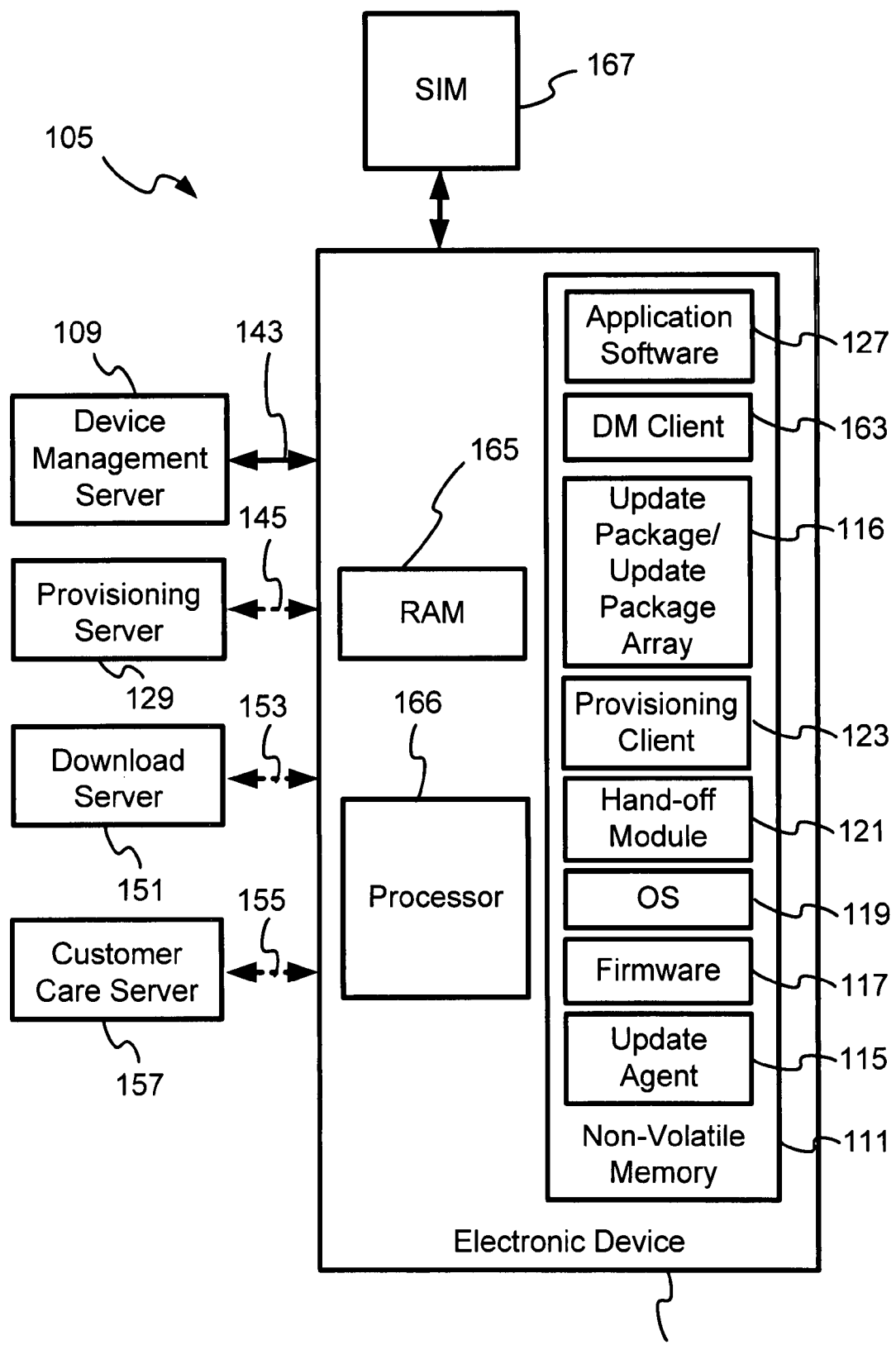
FIG. 1 is a perspective block diagram of an exemplary network that supports remote update of non-volatile memory of an electronic device such as, for example, a mobile handset or personal digital assistant, in accordance with a representative embodiment of the present invention.

Aspects of the present invention relate generally to the updating of memory in electronic devices, and more specifically, to methods and systems supporting device management and processing of updates for firmware, software, configuration parameters and file systems in memory of an electronic device such as, for example, non-volatile FLASH-type memory. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11a/b/g/n compatible networks, the short range wireless technology known as Bluetooth, and similar types of communication links.

In a representative embodiment of the present invention, information for updating memory in an electronic device such as those described above is communicated using, for example, an update package comprising a set of instructions executable by firmware and/or software in the electronic device to transform or convert an existing version of software, firmware, and/or data in the electronic device into a new or updated version of the software, firmware, and/or data. Such an update package may also contain metadata related to the update.

The following definitions, acronyms and abbreviations are use in this document:

| | |
|---|---|
| API | Application Programming Interface |
| CSR | Customer Service Representative |
| DA | Delivery Agent |
| DAO | Data Access Objects |
| DM | Device Management |
| DM Tree | Device management tree |
| EJB | Enterprise Java Beans |
| IMEI | International Mobile Equipment Identity |
| JDBC | Java Database Connectivity |
| JDO | Java Data Objects |
| JNDI | Java Naming and Directory Interface |
| MMV | Refers to a combination of values that define a device make, model and (firmware) version |
| MO | Management Object |
| MOI | Management Object Identifier |
| MSISDN | Mobile Station Integrated Services Digital Network |
| NVM | Non-Volatile Memory |
| OMA | Open Mobile Alliance |
| RAM | Random Access Memory |
| RMI | Remote Method Invocation |
| SMS | Short Message Service |
| SMSC | Short Message Service Center |
| UI | User Interface |
| URI | Universal Resource Identifier |
| URL | Universal Resource Locator |
| WDP | Wireless Datagram Protocol |
| WSP | Wireless Session Protocol |
| XML | Extensible Markup Language |

FIG. 1 is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/benefits by updating the software/firmware. The electronic device 107 may itself be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, in addition to metadata, and checksum information.

As shown in the illustration of FIG. 1, the network 105 in one representative embodiment of the present invention comprises the electronic device 107, a device management (DM) server 109, a provisioning server 129, a customer care server 157, and a download server 151. Although not illustrated in FIG. 1, a representative embodiment of the present invention may also comprise other application servers such as, for example, a diagnostics server, and a self-care website/portal. The electronic device 107 of FIG. 1 is able to communicate with the DM server 109, the download server 151, the customer care server 157, and the provisioning server 129 via communication paths 143, 153, 155 and 145, respectively. Although the communication paths 143, 153, 155, 145 are illustrated as being separate paths between the electronic device 107 and their respective servers, this is only for purpose of illustration, and is not a specific limitation of a representative embodiment of the present invention. The communication paths 143, 153, 155, 145 may be combined into one or more paths that may comprise wired or wireless communication paths such as, for example, a local area network, a public switched telephone network, a wireless personal, local or wide area network, and a cellular or paging network, to name only a few possibilities.

As illustrated in FIG. 1, an electronic device in accordance with one representative embodiment of the present invention comprises a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a provisioning client 123, a hand-off module 121, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages. The electronic device 107 may also comprise interface circuitry (not shown) to enable operable connection of a subscriber identity module (SIM) card 167, that may be employed in accordance with aspects of the present invention described later in this document.

In a representative embodiment of the present invention, an electronic device such as, for example, the electronic device 107 of FIG. 1 may employ an update package (e.g., the update package/update package array 116) delivered by a remote server such as, for example, the download server 151, to update firmware/software, data and configuration information in memory of the electronic device 107. Such an update package may comprise update information including, for example, metadata describing an update, checksums, and instructions executable by one or more update agents such as, for example, the update agent 115 of FIG. 1. The update agent 115 may process a set of executable instructions, which may be used as a compact means to encode differences between existing/first and updated/second versions of firmware, software, data, and configuration parameters for the electronic device 107. The executable instructions may be assembled into update packages to be transmitted to an electronic device for use in updating memory of the electronic device. Update agent(s) in the electronic device may process respective portions of the executable instructions from an update package to convert/transform corresponding portions of an existing/first version of code in memory of the electronic device 107 to portions of an updated/second version of code. The electronic device 107 may also receive provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client mentioned above, which may then be installed and activated in the electronic device 107.

As described briefly above, an electronic device in accordance with a representative embodiment of the present invention (e.g., electronic device 107) may receive update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 may comprise multiple update agents, each of the update agents appropriately arranged to process different types of update information for updating different types/formats of software, firmware, user data, and configuration parameters in the memory of the electronic device 107. Each of the update packages received may be processed in the electronic device by an appropriate one of the update agent(s) 115 to update an associated type of information in the memory of the electronic device 107.

In one representative embodiment of the present invention, an Open Mobile Alliance (OMA) device management (DM)-based applications server is composed of two parts, an OMA DM-based application, and an OMA DM server such as, for example, the DM server 109 shown in FIG. 1. An OMA DM-based application is mainly focused on business processes, logic, and data. An OMA DM server, however, is mainly focused on the functionality required to support the OMA DM protocol by which the OMA DM-based application manipulates OMA DM-capable electronic devices such as, for example, the electronic device 107 of FIG. 1.

An OMA DM common framework in accordance with a representative embodiment of the present invention is arranged to support a set of application programming interfaces (APIs) and call back services, so that OMA DM-based applications may be easily and effectively integrated with an OMA DM server, such as the DM server 109 of FIG. 1, for example. One example of an OMA DM-based application server is the Mobile Variance Platform (MVP) Server developed by Hewlett-Packard Company. An OMA DM-based common framework in accordance with a representative embodiment of the present invention supports a set of APIs and call back services that permit the integration of multiple applications including, for example, a customer care/service application, and other servers with an OMA DM-based server such as the DM server 109 of FIG. 1

A customer care server such as, for example, the customer care server 157 of FIG. 1, may provide an API for issuing OMA DM commands and values to OMA DM capable electronic devices, including the ability to explore the device management tree (DM tree) on the electronic device. Bootstrapping the electronic device may be supported, along with the ability to configure one or more bootstrap messages. A customer care server such as the customer care server 157 may support a simple graphical user interface (UI) to allow OMA DM compatible electronic devices to be bootstrapped, and for commands to be issued to allow the electronic device to be explored and configured via a browser such as, for example, an Internet browser.

In a representative embodiment of the present invention, the code to support OMA DM-based device management for customer care activities of a customer care server (e.g., customer care server 157 of FIG. 1) may be shared with an OMA DM-based application server. By employing a representative embodiment of the present invention, a system ensure that an application server and a customer care server produce identical behavior in their interactions with electronic devices under OMA DM-based device management.

An OMA DM common framework in accordance with one representative embodiment of the present invention provides for the real-time sharing of data by multiple OMA DM Based applications, and may include sharing of the data from a DM tree in an electronic device such as the electronic device 107 of FIG. 1. In a representative embodiment of the present invention, each OMA DM-based application may access the data required to create OMA DM commands for the electronic device.

Currently, each manufacturer of an electronic devices such as the electronic device 107 of FIG. 1 may place electronic device setting parameters (e.g., GPRS setting) in different locations within the DM tree of an electronic device they manufacture. This may cause the node uniform resource identifier (URI) of a given parameter to be different for each electronic device make, model, and version (MMV). Some representative embodiments of the present invention provide a data store to be used in managing DM tree information. Such a data store may hold single device information such as the international mobile equipment identity (IMEI) of the electronic device, a password, and a nonce, to name only a few examples. Some data may be customized for each OMA DM-based application including, for example, the type of authentication scheme to be used, and bootstrap content. Some representative embodiments of the present invention allow a user of a customer care system to modify the bootstrap content, to specify the security type and profile type for devices. The security type may, for example, be one or both of "Networkpin" and "Userpin". Some representative embodiments of the present invention permit notification and bootstrap functionality to be shared by OMA DM-based customer care and application servers such as the customer care server 157 and DM server 109 of FIG. 1, for example. Such an arrangement may permit a user of the customer care server to specify, for example, a short message service center (SMSC) to be used for the sending of notification and bootstrap messages. Some representative embodiments of the present invention provide this functionality through a set of APIs and call back services that support the sending of DM commands and receipt of results.

An example demonstrating how a customer care server may profile a DM tree in an electronic device is discussed below.

Figure 2:
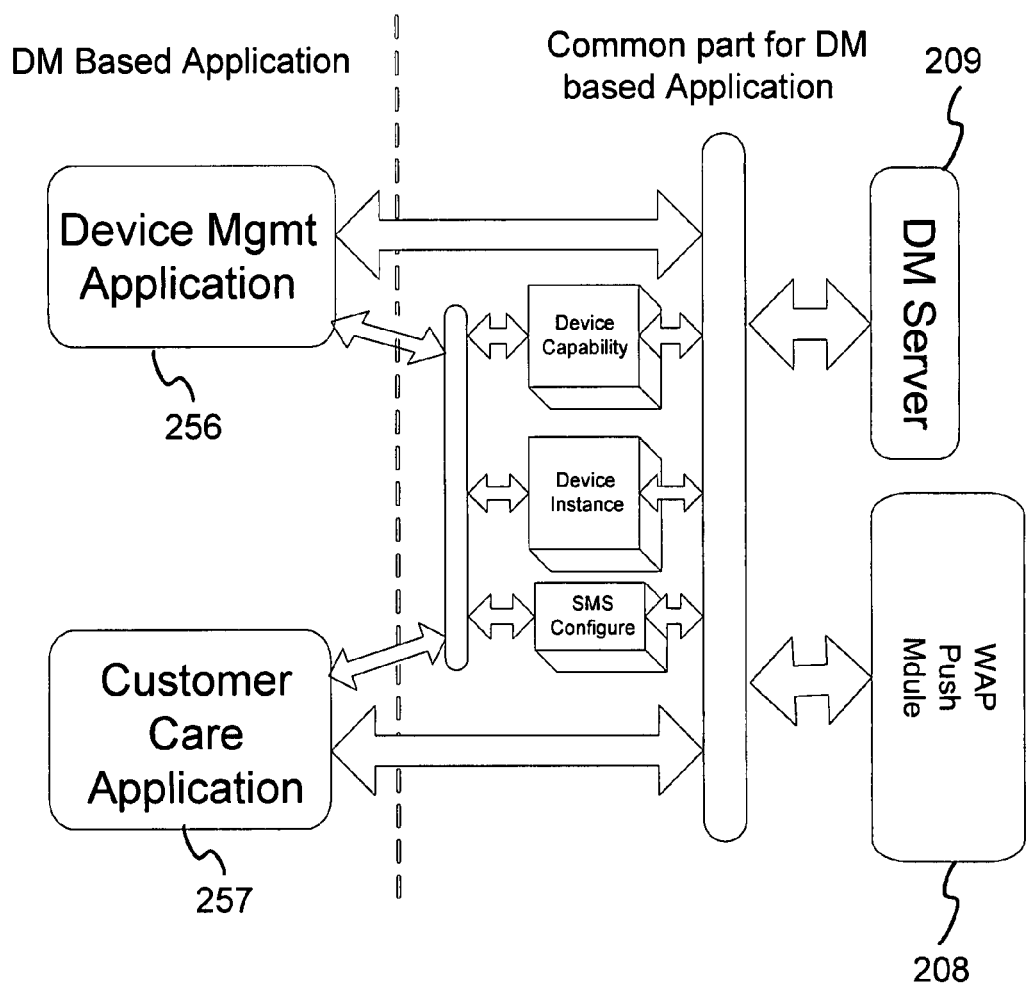
FIG. 2 shows a block diagram of an exemplary OMA DM-based device management architecture employing an OMA DM common framework supporting interactions between OMA DM-based applications servers and an electronic device such as the electronic device of FIG. 1, in accordance with a representative embodiment of the present invention.

FIG. 2 shows a block diagram of an exemplary OMA DM-based device management architecture 200 employing an OMA DM common framework 210 supporting interactions between OMA DM-based applications servers and an electronic device such as the electronic device 107 of FIG. 1, in accordance with a representative embodiment of the present invention. The illustration of FIG. 2 shows two OMA DM-based applications accessing an OMA DM common framework in accordance with a representative embodiment of the present invention. Device management application 256 accesses device capability information, device instance information, and short message service (SMS) configuration information using the application programming interface and call back services provided by the OMA DM common framework. A DM server 209 and WAP push module 208 access the device capability information, device instance information, and short message service (SMS) configuration during interactions with electronic devices such as, for example, the electronic device 107 of FIG. 1.

Figure 3:
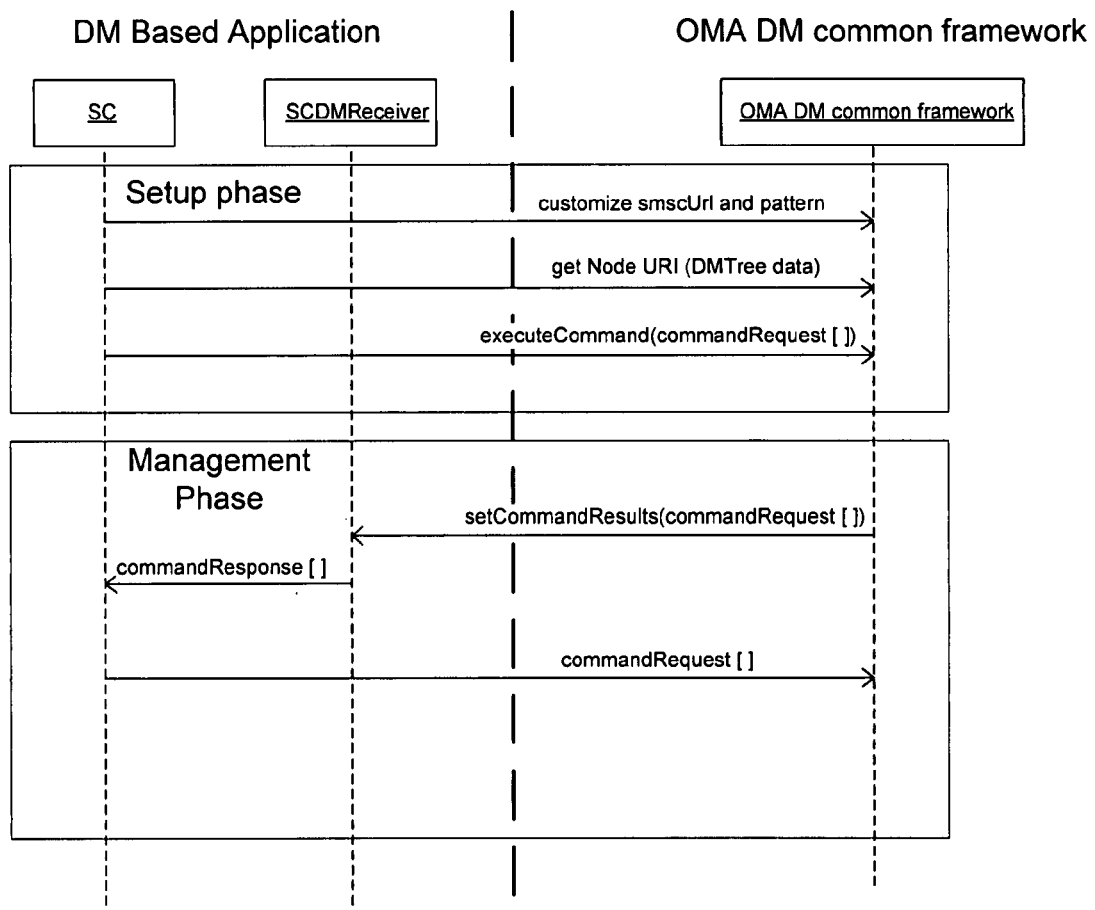
FIG. 3 shows an exemplary message exchange between an OMA DM-based application and an OMA DM common framework during a regular device management session, in accordance with a representative embodiment of the present invention.

FIG. 3 shows an exemplary message exchange between an OMA DM-based application and an OMA DM common framework during a regular device management session, in accordance with a representative embodiment of the present invention. During a setup phase, the OMA DM-based application first customizes an SMS universal resource locator (URL) and pattern information. The OMA DM-based application then gets node universal resource identifier information, using device management (DM) tree data. The OMA DM-based application then employs one of the OMA DM common framework API functions, executeCommand, and passes a CommandRequest object to indicate the SyncML DM command to be issued to the DM client in the electronic device (e.g., electronic device 107 of FIG. 1) involved in the DM session. Additional details of the executeCommand API call and the CommandRequest object are set forth later in this document.

During the management phase, the OMA DM common framework first employs the setCommandResults call back service to communicate the CommandResponse object to the OMA DM based application. In the illustration, this communication is received by functional element SCDMReceiver of the OMA DM based application. As shown in FIG. 3, SCDMReceiver then passes the CommandResponse object to the OMA DM-based application. The OMA DM-based application may then access the CommandRequest object.

Figure 4:
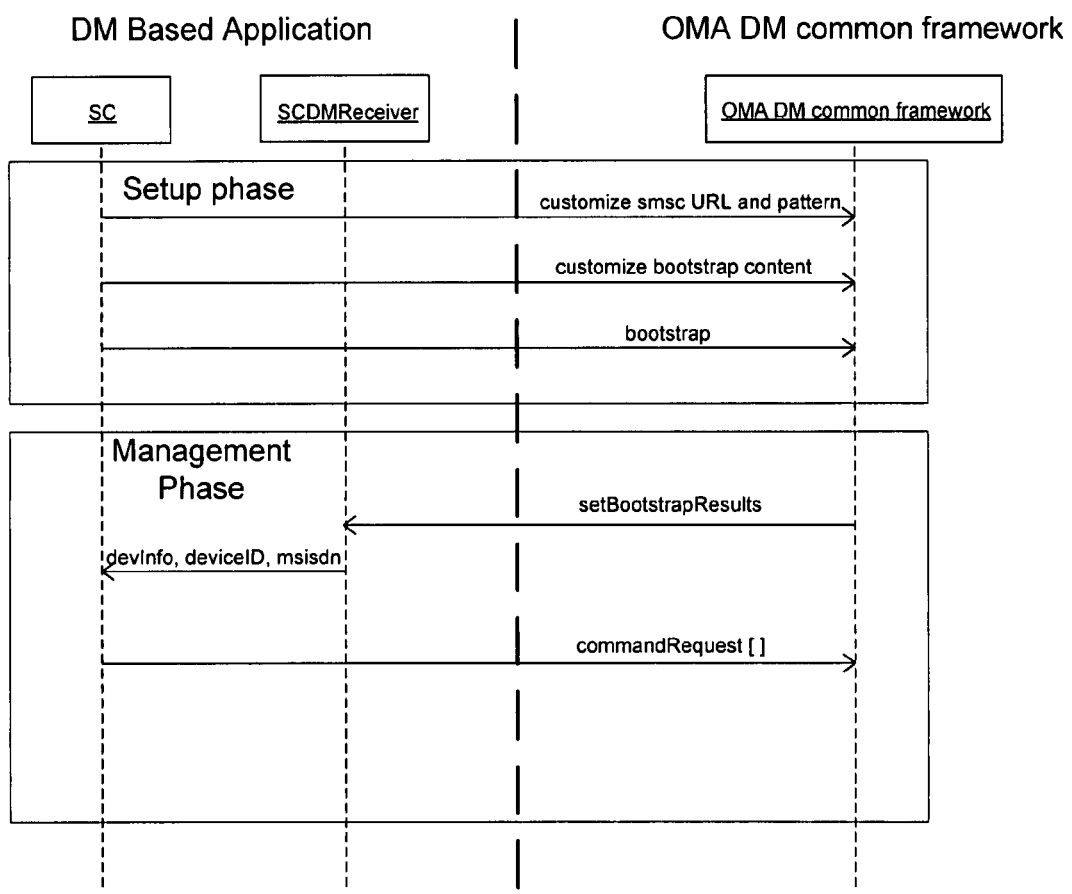
FIG. 4 illustrates an exemplary exchange of messages or control between an OMA DM-based application and an OMA DM common framework during a bootstrap session, in accordance with a representative embodiment of the present invention.

FIG. 4 illustrates an exemplary exchange of messages or control between an OMA DM-based application and an OMA DM common framework during a bootstrap session, in accordance with a representative embodiment of the present invention. During a setup phase, the OMA DM-based application first customizes SMS URL and pattern information. The OMA DM-based application may then customize bootstrap content, and may then transmit a bootstrap to the electronic device (e.g., electronic device 107 of FIG. 1).

During a management phase, the OMA DM common framework employs a setBoostrapResult call back service to pass results of the bootstrap activity to the OMA DM-based application. In the illustration, this communication is received by functional element SCDMReceiver of the OMA DM based application. As shown in FIG. 4, SCDMReceiver then passes device information (devInfo), device identification (devID) and the MSISDN of the electronic device (MSISDN) to the OMA DM-based application. The OMA DM-based application may then access the CommandRequest object.

As shown in FIG. 2, a representative embodiment of the present invention supports multiple OMA DM-based applications at runtime. There are two approaches that may be employed to achieve this, the use of Webservices, and the use of Java Remote Method Invocation (RMI). By using Webservices, an OMA DM-based application may implement the call back service API defined in this document and provide the following information to the OMA DM common framework.

| Name | Description |
| --- | --- |
| Call back service URL | This is the URL of jndi server. By binding this URL with a call back service, the OMA DM common framework may communicate with an OMA DM-based application. |

When using Java Remote Method Invocation, an OMA DM-based application may implement the call back services remote client API defined in this document and provide the following information to the OMA DM common framework.

| Name | Description |
| --- | --- |
| Context.PROVIDER_URL | This is the URL of a jndi server. |
| Context.INITIAL_CONTEXT_FACTORY | This is the service provider definition. |

*-continued*

| Name | Description |
| --- | --- |
| Call back service jndi name | The OMA DM common framework may use this name to look up the remote client API. |

A representative embodiment of the present invention defines a set of objects for communication between an OMA DM-based application (e.g., device management application 256 and customer care application 257 of FIG. 2) and an OMA DM common framework. An API in accordance with a representative embodiment of the present invention is clean, easy to understand and at the same time extensible. Six objects (CommandRequest, CommandResponse, MMV, DeviceCapability, DeviceInstance, and SMSCConfiguration) are defined below that are representative of those that may be used for communication between an OMA DM-based application and the OMA DM common framework, in accordance with a representative embodiment of the present invention. Although five objects are employed in the examples of the present application, a different number or set of objects may be employed in a representative embodiment of the present invention.

Some representative embodiments of the present invention employ an API object named "CommandRequest", which is used by an OMA DM-based application to indicate to the OMA DM common framework the SyncML DM command to issue to a DM client (e.g., 163 of FIG. 1) and to identify associated attributes. Table 1, below, shows an exemplary structure of a CommandRequest object in accordance with a representative embodiment of the present invention.

TABLE 1

| Attribute | Type | Description |
| --- | --- | --- |
| command | String | This attribute may be used to define an actual OMA DM command to be issued. Valid values are: Get, Replace, Exec, Copy, Add, Delete, Alert, Sequence, and Atomic. |
| targetURI | String | This attribute may be used to define the URI of the node on which the command is issued. e.g., command="Get" targetURI='./DevDetail' |
| sourceURI | String | Applicable when the command is "Copy". |
| value[ ] | Object | This attribute may be used to define the data for the command. e.g., if the command is "Replace", this attribute defines the value to set in that node. The value array may contain a single element, but in some cases (e.g., the Alert command) it may contain multiple values For example, for Alert 1103:<br>value[0] = "1103"<br>value[1] = "MINDT=10&MAXDT=20&DR=1"<br>Value[3] = "Select a color"<br>Value[4] = "Red"<br>Value[5] = "Green"<br>Value[6] = "Blue" |
| Format | String | This attribute may be used to define the format of the data.(e.g., bin, chr, b64, bool, int, xml, node) |
| optIn | Int | This attribute may be used to define the optIn parameter when sending the OMA DM notification. Its valid values may comprise integers 0 to 3, which correspond to the <ui-mode> field in the DM SMS notification message. See Section 6.2.7 in OMA-SyncML-DMNotification-V1_1_2-20031205-A.pdf |
| commandRequests | CommandRequest [ ] | This attribute may be used to wrap more commands within this command. For example: Used for Atomic and Sequence. |

Some representative embodiments of the present invention employ an API object named "CommandResponse", which is used to report back the results or the status of the command back to the OMA DM Based application. Table 2, below, shows an exemplary structure of a CommandResponse object in accordance with a representative embodiment of the present invention.

TABLE 2

| Attribute | Type | Description |
| --- | --- | --- |
| Command | String | This attribute may be used to define the command from which these results come. |
| statusCode | String | This attribute may be used to define the status code returned by the DM client. Example: In case of Alert 1226, the status Code may be: 1226 |
| uri[ ] | String | This attribute may be used to define the node URI for the command. For example: if the command was Get on "./DevDetail", this uri attribute will be: "./DevDetail" If the Get was issued on a |

TABLE 2-continued

| Attribute | Type | Description |
|---|---|---|
| value[ ] | String | tree node, the results may be of all leaf nodes. In that case, the array may have more than one element. This attribute may be used to define the data of the resulting command. For example: if the command is a "Get" on "./DevDetail", this attribute may be the value of that sub-tree in extensible markup language (XML) form. Example: in Case of Alert 1226 Value[0] = Result code Value[1] = Alert type Value[2] = correlator |
| format[ ] | String | This attribute may be used to define the type of returned data. |

Some representative embodiments of the present invention employ an API object named "MMV", that is used by an OMA DM-based application and OMA DM common framework to represent the make, model and version of an electronic device (e.g., electronic device 107 of FIG. 1). Table 3, below, shows an exemplary structure of a MMV object in accordance with a representative embodiment of the present invention.

TABLE 3

| make | String | This attribute may be used to indicate the manufacturer of the electronic device. |
|---|---|---|
| model | String | This attribute may be used to indicate the model of the electronic device. |
| version | String | This attribute may be used to indicate the (firmware) version of the electronic device. |

Some representative embodiments of the present invention employ an API object named "DeviceCapability", that is used by an OMA DM-based application and OMA DM common framework to customize the data related to device. (e.g., electronic device 107 of FIG. 1). Table 4, below, shows an exemplary structure of a DeviceCapability object in accordance with a representative embodiment of the present invention.

TABLE 4

| Attribute | Type | Description |
|---|---|---|
| name | String | This attribute may be used to define the name of the device capability. |
| description | String | This attribute may be used to provide the description of the DeviceCapability. |
| mmv | MMV | This attribute may be used to indicate the make, model and version. |
| DeviceParameter[ ] | deviceParameters | This attribute may be used to define the deviceParameters representing: DMTree data Authentication scheme |

TABLE 4-continued

| Attribute | Type | Description |
|---|---|---|
| bootstrapTemplate | byte[ ] | Bootstrap profile type Bootstrap sec type This attribute may be used to define the content of the bootstrap. |

Some representative embodiments of the present invention employ an API object named "DeviceInstance", that is used by an OMA DM-based application and OMA DM common framework to represent the data related to a single device. (e.g., electronic device 107 of FIG. 1). Table 5, below, shows an exemplary structure of a DeviceInstance object in accordance with a representative embodiment of the present invention.

TABLE 5

| Attribute | Type | Description |
|---|---|---|
| msisdn | String | This attribute may be used to define a phone number of the electronic device. |
| deviceId | String | This attribute may be used to define an IMEI for the electronic device. |
| description | String | This attribute may be used to describe the electronic device. |
| status | String | This attribute may be used to indicate the current status of the electronic device. Valid values may be: UNKNOWN - Cannot determine the status UNASSIGNED - The electronic device is not yet associated with a subscriber. ASSIGNED - An electronic device associated with a subscriber. QUARANTINED - No actions are to be performed for this electronic device. PROVISIONED - The electronic device has been provisioned. NEEDS_UPDATE - The electronic device is assigned to a subscriber, but an update is to be done later. |
| DeviceCapability | deviceCapability | This attribute may be used to define the DeviceCapability assigned to this device |
| lastProvisionDate | Date | This attribute may be used to indicate the last date the electronic device was provisioned. |
| clientUserName | String | This attribute may be used to define the client user name used by OMA DM common framework to authenticate the electronic device. |
| clientPassword | String | This attribute may be used to indicate the client password used by OMA DM common framework to authenticate the electronic device. |
| clientNonce | String | This attribute may be used to define the client nonce used by OMA DM common framework to authenticate the electronic device in case |

TABLE 5-continued

| Attribute | Type | Description |
|---|---|---|
| serverNonce | String | authentication type is MD5 and HMAC. This attribute may be used by the OMA OM common framework to generate credential sent to the electronic device in case the authentication type is MD5 or HMAC. |
| serverPassword | String | This attribute may be used by the OMA DM common framework to generate credential sent to the electronic device in case authentication type is MD5 or HMAC. |
| type | String | This attribute may be used to indicate the electronic device type (e.g., Home, Work, etc.) |
| createdBy | String | This attribute may be used to indicate the user who uploaded this electronic device instance. |
| lastModifiedBy | String | This attribute may be used to indicate the user who last modified the device instance for the electronic device. |
| createdTimeStamp | Date | This attribute may be used to indicate the time when this device instance was uploaded. |
| lastModifiedTimeStamp | Date | This attribute may be used to define the time when this device instance was last modified. | employ an API object named "SMSCConfiguration", that may used by an OMA DM-based application and OMA DM common framework to represent the data related to the configuration of a short message service center. Table 6, below, shows an exemplary structure of a SMSCConfiguration object in accordance with a representative embodiment of the present invention.

TABLE 6

| Attribute | Type | Description |
|---|---|---|
| smsHostAddress | String | This attribute may be used to indicate the manufacturer of the electronic device. |
| smsPort | String | This attribute may be used to indicate the model of the electronic device. |
| smsPassword | String | This attribute may be used top indicate the (firmware) version of the electronic device. |
| smsUserName | String | This attribute may be used to indicate the user name of the SMS. |
| Description | String | |
| smscName | String | This attribute may be used to indicate the SMSC name. |
| messagesPerMinute | int | This attribute may be used to indicate the number of messages to send per minute. |
| createdBy | String | |
| lastModifiedBy | String | |
| dateCreated | Date | |
| smppSystemType | String | |
| smppDTON | String | |
| smppDNPI | String | |
| smppRange | String | |

TABLE 6-continued

| Attribute | Type | Description |
|---|---|---|
| smppOADDR | String | |
| smppOTON | String | |
| smppONPI | String | |
| smppServiceType | String | |
| kannelUri | String | This attribute may be used to indicate the URI of the kannel. |
| kannelHdrLength | String | This attribute may be used to indicate the hdr length of the kannel. |
| protocol | String | This attribute may be used to indicate the protocol used to send SMS. kannel ucp smpp |
| isDefault | boolean | |

A representative embodiment of the present invention provides a application programming interface (API) that permits an OMA DM-based application to send device management (DM) commands to an electronic device such as, for example, the electronic device 107 of FIG. 1. Such an API may provide a number of API functions and call back services to support communication between an OMA DM-based application and an OMA DM server such as, for example, the DM server 109 of FIG. 1.

Some representative embodiments of the present invention provide a API function to execute a command on a single electronic device. A function prototype for such a function may appear as follows:

public void executeCommand (String session, CommandRequest[ ] cmd, String msisdn, String expectedDeviceId, String authScheme)

In a representative embodiment of the present invention, this function may be an asynchronous call. The DM server may use the "cmd" parameter to determine which OMA DM command to issue to the electronic device. The expectedDeviceId (e.g., IMEI) and authScheme parameters may be passed to save calls by a DM server such as DM server 109 of FIG. 1 to an OMA DM-based application server. If the DM client in the electronic device (e.g., electronic device 107 of FIG. 1) responds with a deviceId (e.g., IMEI) which is different than the expectedDeviceId, the DM server may perform a call to the OMA DM-based application server using a call back service such as "processDevice( )", described later in this document. If the value returned by the OMA DM-based application server is "true", the OMA DM server may make a call to a function that may be named "getAuthScheme( )", to determine the identity of an XML file (e.g., DBOfficer) to use for authentication. If, however, the DM Client returns a deviceId that is the same as the expectedDeviceId, then the DM server may not make a call to "processDevice( )" and may use the authorization mechanism indicated by the authScheme parameter sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server.

Table 7, shown below, illustrates an exemplary set of parameters that may be used with the "executeCommand" API call.

TABLE 7

| Name | Description |
|---|---|
| session | This parameter may be used to define a string used by a OMA DM-based application as an internal session identifier. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| msisdn | This parameter may be used to define the phone number of the electronic device on which to issue the command. |
| expectedDeviceId | This parameter may be used to define the expected deviceId to respond. |
| authScheme | This parameter may be used to define the string that contains a full path to the XML file having the authentication class/scheme to use. |

TABLE 8

| Name | Description |
|---|---|
| Session | This parameter may be used to define a string used by a OMA DM-based application as an internal session identifier. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| msisdn[ ] | This parameter may be used to define all of the phone numbers of the electronic devices on which to issue the command. |
| expectedDeviceId[ ] | This parameter may be used to define the expected deviceIds corresponding to the MSISDNs to respond. |
| authScheme[ ] | This parameter may be used to define the string that contains a full path to the XML file having the authentication class/scheme to use. |

Some representative embodiments of the present invention provide an API function to execute a command on multiple electronic devices for one API call. A function prototype for such a function may appear as follows:

public void executeCommand (String session, CommandRequest[ ][ ] cmd, String msisdn[ ], String expectedDeviceId[ ], String authScheme[ ])

In a representative embodiment of the present invention, this function may be an asynchronous call. The DM server may use the "cmd" parameter array to determine which OMA DM command to issue to each electronic device. The expectedDeviceId (IMEI) and authScheme parameter arrays may be passed to save calls by a DM server such as DM server 109 of FIG. 1 to an OMA DM-based application server. If the DM client in any of the identified electronic devices (e.g., electronic device 107 of FIG. 1) responds with a deviceId (IMEI) which is different than the expectedDeviceId, the DM server may perform a call to the OMA DM-based application server using a call back service such as "processDevice( )", described later in this document. If the value returned by the OMA DM-based application server is "true", the OMA DM server may make a call to a function that may be named "getAuthScheme( )", to determine the identity of an XML file (e.g., DBOfficer) to use for authentication of that electronic device. If, however, the DM Client returns a deviceId that is the same as the expectedDeviceId, then the DM server may not make a call to "processDevice( )" and may use the authorization mechanism indicated by the authScheme parameter for that electronic device, as sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server.

Table 8, shown below, illustrates an exemplary set of parameters that may be used with the "executeCommand" API call.

Some representative embodiments of the present invention provide an alternate API function to execute a command on a single electronic device. A function prototype for such a function may appear as follows:

public void executeCommand (HashMap session, CommandRequest[ ] cmd, String msisdn, String expectedDeviceId, String authScheme)

In a representative embodiment of the present invention, this function may be an asynchronous call. The DM server may use the "cmd" parameter to determine which OMA DM command to issue to the electronic device. The expectedDeviceId (IMEI) and authScheme parameters may be passed to save calls by a DM server such as DM server 109 of FIG. 1 to an OMA DM-based application server. If the DM client in the electronic device (e.g., electronic device 107 of FIG. 1) responds with a deviceId (IMEI) which is different than the expectedDeviceId, the DM server may perform a call to the OMA DM-based application server using a call back service such as "processDevice( )", described later in this document. If the value returned by the OMA DM-based application server is "true", the OMA DM server may make a call to a function that may be named "getAuthScheme( )", to determine the identity of an XML file (e.g., DBOfficer) to use for authentication. If, however, the DM Client returns a deviceId that is the same as the expectedDeviceId, then the DM server may not make a call to "processDevice( )" and may use the authorization mechanism indicated by the authScheme parameter sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server. This PI function may be employed by some OMA DM-based applications, and the DM common framework may send back information by calling a call back service defined in the "session" parameter.

Table 9, shown below, illustrates an exemplary set of parameters that may be used with the "executeCommand" API call.

TABLE 9

| Name | Description |
| --- | --- |
| session | This parameter may be used to define a HashMap object that contains the following elements:<br>Protocol - This value may be used to indicate the protocol used by call back service. The value may be RMI or Webservice.<br>CallBackUrl - In case of Webservice, this value may be the web service URL.<br>Context.PROVIDER_URL - In case of RMI, this value may be the jndi server address.<br>Context.INITIAL_CONTEXT_FACTORY - In case of RMI, this value may be the service provider definition.<br>jndiName - In case of RMI, this value may be the jndi name of the Enterprise Java Bean (EJB) that implements the call back service.<br>sessionId - This value may be a DM based application's internal session identifier.<br>sendMsg - This value may be a flag to indicate whether the DM-based application wants to send the notification and bootstrap itself. The value may be "T" or "F", where "T" may mean the DM application wants to send notification and bootstrap message itself, and "F" may mean the DM application wants the DM common framework to send notification and bootstrap message. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| msisdn | This parameter may be used to define the phone number of the electronic device on which to issue the command. |
| expectedDeviceId | This parameter may be used to define the expected deviceId to respond. |
| authScheme | This parameter may be used to define the string that contains a full path to the XML file having the authentication class/scheme to use. |

Some representative embodiments of the present invention provide an alternate API function to execute a command on multiple electronic devices for one API call. A function prototype for such a function may appear as follows:

public void executeCommand (HashMap session, CommandRequest[ ][ ] cmd, String msisdn[ ], String expectedDeviceId[ ], String authScheme[ ])

In a representative embodiment of the present invention, this function may be an asynchronous call. The DM server may use the "cmd" parameter array to determine which OMA DM command to issue to each electronic device. The expectedDeviceId (IMEI) and authScheme parameter arrays may be passed to save calls by a DM server such as DM server 109 of FIG. 1 to an OMA DM-based application server. If the DM client in any of the identified electronic devices (e.g., electronic device 107 of FIG. 1) responds with a deviceId (IMEI) which is different than the expectedDeviceId, the DM server may perform a call to the OMA DM-based application server using a call back service such as "processDevice( )", described later in this document. If the value returned by the OMA DM-based application server is "true", the OMA DM server may make a call to a function that may be named "getAuthScheme( )", to determine the identity of an XML file (e.g., DBOfficer) to use for authentication of that electronic device. If, however, the DM Client returns a deviceId that is the same as the expectedDeviceId, then the DM server may not make a call to "processDevice( )" and may use the authorization mechanism indicated by the authScheme parameter for that electronic device, as sent in the call to "executeCommand". The results of this call may be conveyed back to the OMA DM-based application by a call back API such as, for example, the "setCommandResults" call back service API, described later in this document. In some representative embodiments of the present invention, when the DM common framework is unable to find call back server URL information, the OMA DM common framework may treat a designated OMA DM-based application server as the call back service server.

Table 10, shown below, illustrates an exemplary set of parameters that may be used with the "executeCommand" API call.

TABLE 10

| Name | Description |
| --- | --- |
| session | This parameter may be used to define a HashMap object that contains the following elements:<br>Protocol - This value may be used to indicate the protocol used by call back service. The value may be RMI or Webservice.<br>CallBackUrl - In case of Webservice, this value may be the web service URL.<br>Context.PROVIDER_URL - In case of RMI, this value may be the jndi server address.<br>Context.INITIAL_CONTEXT_FACTORY - In case of RMI, this value may be the service provider definition.<br>jndiName - In case of RMI, this value may be the jndi name of the Enterprise Java Bean (EJB) that implements the call back service.<br>sessionId - This value may be a DM based application's internal session identifier.<br>sendMsg - This value may be a flag to indicate whether the DM-based application wants to send the notification and bootstrap itself. The value may be "T" or "F", where "T" may mean the DM application wants to send notification and bootstrap message itself, and "F" may mean the DM application wants the DM common framework to send notification and bootstrap message. |
| cmd | This parameter may be used to define the command object containing the details of the OMA DM command to be executed. The array length may be 1, but in some cases (e.g., "Sequence" or when a "Replace" followed by "Exec" is performed), there may be multiple commands in the array. |
| Msisdn[ ] | This parameter may be used to define the phone number of the electronic device on which to issue the command. |
| expectedDeviceId[ ] | This parameter may be used to define the expected deviceId to respond. |
| authScheme[ ] | This parameter may be used to define the string that contains a full path to |

TABLE 10-continued

| Name | Description |
|---|---|
| | the XML file having the authentication class/scheme to use. |

Some representative embodiments of the present invention provide an API function to cancel a device management command on an electronic device. A function prototype for such a function may appear as follows:

public String cancelCommand (String session, String msisdn)

In a representative embodiment of the present invention, this function may be a synchronous call. The DM server may cancel or delete any pending DM command for the electronic device with the specified phone number. Such an API call may return a 0 if a command is successfully cancelled, and may return −1 if an error occurs while deleting a DM command.

Some representative embodiments of the present invention provide an alternate API function to cancel a device management command on an electronic device. A function prototype for such a function may appear as follows:

public String cancelCommand (HashMap session, String msisdn)

In a representative embodiment of the present invention, this function may be a synchronous call. The DM server may cancel or delete any pending DM command for the electronic device with the specified phone number. Such an API call may return a 0 if a command is successfully cancelled, and may return −1 if an error occurs while deleting a DM command.

Some representative embodiments of the present invention provide an API function to retry a device management command on an electronic device. A function prototype for such a function may appear as follows:

public String retryCommand (String session, String msisdn)

In a representative embodiment of the present invention, this function may be a synchronous call. The DM server may retry the last DM command that was issued to the electronic device. The DM server may first cancel and then re-issue the command. Such an API call may return a 0 if a command retry is successful, and may return −1 if an error occurs while retrying a DM command.

Some representative embodiments of the present invention provide an alternate API function to retry a device management command on an electronic device. A function prototype for such a function may appear as follows:

public String retryCommand (HashMap session, String msisdn)

In a representative embodiment of the present invention, this function may be a synchronous call. The DM server may retry the last command that was issued to the electronic device. The DM server may first cancel and then re-issue the command. Such an API call may return a 0 if a command retry is successful, and may return −1 if an error occurs while retrying a DM command.

An OMA DM-based application in accordance with some representative embodiments of the present invention provides a call back service function to report the results of a device management command on an electronic device. A function prototype for such a function may appear as follows:

public CommandRequest[ ] setCommandResults (String session, String devInfo, CommandResponse[ ] response, String msisdn)

In a representative embodiment of the present invention, a DM server (e.g., DM server 109 of FIG. 1) may use such a function to report back the results of a DM command including the status and return value(s). This function may return CommandRequest[ ], it there are more commands to be executed, or Null if no additional commands are to be executed. If the latter case, the DM session may be ended.

Table 11, shown below, illustrates an exemplary set of parameters that may be used with the "setCommandResults" API call.

TABLE 11

| Name | Description |
|---|---|
| session | This parameter may be used by an OMA DB-based application as an internal session identifier. |
| devInfo | This parameter may be an XML string containing a "./DevInfo" sub-tree. |
| response | This parameter may be the results of the CommandRequest that was sent. |
| msisdn | This parameter may be the phone number of the electronic device which responded. |

Some representative embodiments of the present invention provide a call back service function to be used by a DM server such as the DM server 109 of FIG. 1 when the device ID received from the electronic device is not the expected device ID. A function prototype for such a function may appear as follows:

public boolean processDevice (String session, String msisdn, String devInfo)

In a representative embodiment of the present invention, a DM server (e.g., DM server 109 of FIG. 1) may use such a function when the device ID returned by the electronic device does not match the IMEI sent in the initial call. The OMA DM-based application may check a policy about what to do with the electronic device and may return a boolean flag indicating that the DM server (e.g., DM server 109 of FIG. 1) may proceed with the DM session or abort it. A return value of "true" may indicate that the DM session may proceed, while a value of "false" may indicate that a DM session should be aborted.

Table 12, shown below, illustrates an exemplary set of parameters that may be used with the "processDevice" call back service call.

TABLE 12

| Name | Description |
|---|---|
| session | This parameter may be used by an OMA DB-based application as an internal session identifier. |
| devInfo | This parameter may be an XML string containing a "./DevInfo" sub-tree. |
| msisdn | This parameter may be the phone number of the electronic device which responded. |

Some representative embodiments of the present invention provide a call back service function to be used by a DM server such as the DM server 109 of FIG. 1 to determine an appropriate authentication scheme when the received device ID of the responding electronic device is not the device ID expected. A function prototype for such a function may appear as follows:

public String getAuthScheme (String session, String devInfo)

In a representative embodiment of the present invention, a DM server (e.g., DM server 109 of FIG. 1) may use such a function when the device ID returned by the electronic device does not match the IMEI sent in the initial call. The OMA DM-based application may return the full path to an XML file to be used to load the correct authentication class to be used to perform authentication. The return value may be the full path to the XML file containing the class to be loaded.

Table 13, shown below, illustrates an exemplary set of parameters that may be used with the "getAuthScheme" call back service call.

TABLE 13

| Name | Description |
|---|---|
| session | This parameter may be a string containing session information. The DM server may have received this session information during an initial query call. |
| devInfo | This parameter may be an XML string containing a "./DevInfo" sub-tree. |

Some representative embodiments of the present invention provide an API function to be used by an OMA DM-based application to bootstrap a single electronic device. A function prototype for such a function may appear as follows:

public void Bootstrap (String session, Bootstrap Bootstrap)

In a representative embodiment of the present invention, this function may be an asynchronous call. A DM server (e.g., DM server 109 of FIG. 1) may create a Bootstrap message according to information provided in a Bootstrap object. Calculated credentials may be stored in a DEVICE_INSTANCE table organized in rows by device ID. This table may be updated for the appropriate device ID. In some representative embodiments of the present invention, an electronic device (e.g., electronic device 107 of FIG. 1) may send a defined package of information after a successful Bootstrap. In other representative embodiments, such a package of information may not be sent. If the electronic device does send a package of information after a successful bootstrap, the DM server may report back the Bootstrap using a call back service function such as setBootstrapResults, described later in this document.

Table 14, shown below, illustrates an exemplary set of parameters that may be used with the "Bootstrap" API function call.

TABLE 14

| Name | Description |
|---|---|
| Session | This parameter may be a string containing session information. The DM server may have received this session information during an initial query call. |
| devInfo | This parameter may be an XML string containing a "./DevInfo" sub-tree. |

Some representative embodiments of the present invention provide an API function to be used by an OMA DM-based application such as the DM server 109 of FIG. 1 to bootstrap multiple electronic devices with a single API call. A function prototype for such a function may appear as follows:

public void Bootstrap (String session, Bootstrap Bootstrap[ ])

In a representative embodiment of the present invention, this function may be an asynchronous call. This is similar to the Bootstrap call shown above, with the exception that the Bootstrap parameter may be an array of objects for the electronic devices to be boostrapped during the DM session.

Some representative embodiments of the present invention provide an API function to be used by an OMA DM-based application to create a bootstrap message without sending it to the intended electronic device recipient. A function prototype for such a function may appear as follows:

public String createBootstrapMessage (String session, Bootstrap Bootstrap[ ])

In a representative embodiment of the present invention, this function may be a synchronous call. This is similar to the Bootstrap call shown in the above two sections, but instead of sending the bootstrap message to the intended electronic device, the API function may immediately return the calculated text comprising a bootstrap XML message string. In addition, calculated credentials may be stored (e.g., in DEVICE_INSTANCE).

Some representative embodiments of the present invention provide an alternate API function to be used by an OMA DM-based application to create a bootstrap message without sending it to the intended electronic device recipient. A function prototype for such a function may appear as follows:

public String createBootstrapMessage (HashMap session, Bootstrap Bootstrap[ ])

In a representative embodiment of the present invention, this function may be a synchronous call. This call is similar to the Bootstrap call shown in the above section. Instead of sending the bootstrap message to the intended electronic device, this API function may immediately return the calculated text comprising a bootstrap XML message string. In addition, calculated credentials may be stored (e.g., in DEVICE_INSTANCE).

Some representative embodiments of the present invention provide an API function to be used by an OMA DM-based application to bootstrap an electronic device. A function prototype for such a function may appear as follows:

public void bootstrapDevice(HashMap session, String msisdn, String deviceId, MMV mmv, String pin)

In a representative embodiment of the present invention, an OMA DM-based application may use this API function to cause the OMA DM common framework to bootstrap an electronic device (e.g., the electronic device 107 of FIG. 1) according to the DeviceCapability information associated with the electronic device.

Table 15, shown below, illustrates an exemplary set of parameters that may be used with the "bootstrapDevice" API function call.

TABLE 15

| Name | Description |
|---|---|
| Session | This parameter may be a HashMap object that may be used by the OMA DM common framework to call the "processDevice" and "setBootstrapResults" call back services. This attribute may be used to define a HashMap object that contains the following elements:<br>Protocol - This value may be used to indicate the protocol used by call back service. The value may be RMI or Webservice.<br>CallBackUrl - In case of Webservice, this value may be the web service URL.<br>Context.PROVIDER_URL - In case of RMI, this value may be the jndi server address. |

TABLE 15-continued

| Name | Description |
| --- | --- |
|  | Context.INITIAL_CONTEXT_FACTORY - In case of RMI, this value may be the service provider definition. |
|  | jndiName - In case of RMI, this value may be the jndi name of the Enterprise Java Bean (EJB) that implements the call back service. |
|  | sessionId - This value may be a DM based application's internal session identifier. |
|  | sendMsg - This value may be a flag to indicate whether the DM-based application wants to send the notification and bootstrap itself. The value may be "T" or "F", where "T" may mean the DM application wants to send notification and bootstrap message itself, and "F" may mean the DM application wants the DM common framework to send notification and bootstrap message. |
| msisdn | This parameter may be the phone number of the electronic device. |
| deviceID | This parameter may be a device identifier. |
| mmv | This parameter may be the make, model and version of the electronic device. |
| pin | This parameter may be the pin number used to calculate the mac value. |

Some representative embodiments of the present invention employ a call back service function to be used by a DM server such as the DM server 109 of FIG. 1 to notify an OMA DM-based application of the results of a bootstrap operation. A function prototype for such a function may appear as follows:

public void setBootstrapResults(String session,String deviceId, String status)

In a representative embodiment of the present invention, an OMA DM-based application may provide/expose such a call back service to permit a DM server (e.g., DM server 109 of FIG. 1) to notify the OMA DM-based application of the results of a bootstrap operation.

Table 16, shown below, illustrates an exemplary set of parameters that may be used with the "setBootstrapResults" call back service call.

TABLE 16

| Name | Description |
| --- | --- |
| session | This parameter may be a string used by an OMA DM-based application as an internal session identifier. |
| deviceID | This parameter may be an identifier of the electronic device. |
| status | This parameter may be the status of the bootstrap operation. |

Some representative embodiments of the present invention employ a call back service function to be used by a DM server such as the DM server 109 of FIG. 1 to cause the sending of a DM notification message to a single electronic device. A function prototype for such a function may appear as follows:

Public void sendMessage(String session, String msisdn, byte[ ] message)

In a representative embodiment of the present invention, an OMA DM-based application may provide/expose such a call back service to permit a DM server (e.g., DM server 109 of FIG. 1) to send a SMS DM notification to one electronic device (e.g., electronic device 107 of FIG. 1).

Table 17, shown below, illustrates an exemplary set of parameters that may be used with the "sendMessage" call back service call.

TABLE 17

| Name | Description |
| --- | --- |
| session | This parameter may be a string used by an OMA DM-based application as an internal session identifier. |
| msisdn | This parameter may be the phone number of he electronic device to which the SMS DM notification is to be sent. |
| message[ ] | This parameter may be a byte array containing the information for the notification such as, for example, wireless datagram protocol (WDP), wireless session protocol (WSP) and content. |

Some representative embodiments of the present invention employ a call back service function to be used by a DM server such as the DM server 109 of FIG. 1 to cause the sending of a DM notification message to multiple electronic devices. A function prototype for such a function may appear as follows:

Public void sendMessage(String session, String msisdn[ ], byte[ ][ ] message)

In a representative embodiment of the present invention, an OMA DM-based application may also provide/expose such a call back service to permit a DM server (e.g., DM server 109 of FIG. 1) to send a SMS DM notification to multiple electronic devices (e.g., electronic device 107 of FIG. 1) (e.g., a bulk operation).

Table 18, shown below, illustrates an exemplary set of parameters that may be used with the "sendMessage" call back service call.

TABLE 18

| Name | Description |
| --- | --- |
| session | This parameter may be a string used by an OMA DM-based application as an internal session identifier. |
| msisdn[ ] | This parameter may be the phone number of each of the electronic devices to which an SMS DM notification is to be sent. |
| message[ ][ ] | This parameter may be a byte array containing the information for each notification to be sent such as, for example, wireless datagram protocol (WDP), wireless session protocol (WSP) and content for an electronic device. |

Some representative embodiments of the present invention employ a call back service function to be used by a DM server such as the DM server 109 of FIG. 1 to cause the sending of a DM bootstrap message to a single electronic device. A function prototype for such a function may appear as follows:

public void sendMessage(String session, String Bootstrap-Type, String msisdn, byte[ ] hdr, byte[ ] messageBody)

In a representative embodiment of the present invention, an OMA DM-based application may provide/expose such a call back service to permit a DM server (e.g., DM server 109 of FIG. 1) to send a SMS DM notification to one electronic device (e.g., electronic device 107 of FIG. 1).

Table 19, shown below, illustrates an exemplary set of parameters that may be used with the "sendMessage" call back service call.

TABLE 19

| Name | Description |
| --- | --- |
| session | This parameter may be a string used by an OMA DM-based application as an internal session identifier. |
| Bootstrap Type | This parameter may be used to indicate the type of bootstrap to perform, either WAP or plain. |
| hdr[ ] | This parameter may be a byte array containing the SMS message header for the boostrap message. |
| messageBody[ ] | This parameter may be a byte array containing the SMS message body for the boostrap message. |

Some representative embodiments of the present invention employ a call back service function to be used by a DM server such as the DM server 109 of FIG. 1 to cause the sending of a DM bootstrap message to multiple electronic devices for a single call. A function prototype for such a function may appear as follows:

public void sendMessage(String session, String Bootstrap-Type, String msisdn[ ], byte[ ][ ] hdr, byte[ ][ ] messageBody)

In a representative embodiment of the present invention, an OMA DM-based application may provide/expose such a call back service to permit a DM server (e.g., DM server 109 of FIG. 1) to send a SMS DM notification to a number of electronic devices (e.g., electronic device 107 of FIG. 1) as a result of a single call.

Table 20, shown below, illustrates an exemplary set of parameters that may be used with the "sendMessage" call back service call.

TABLE 20

| Name | Description |
| --- | --- |
| session | This parameter may be a string used by an OMA DM-based application as an internal session identifier. |
| Bootstrap Type | This parameter may be used to indicate the type of bootstrap to perform, either WAP or plain. |
| hdr[ ][ ] | This parameter may be a byte array containing the SMS message headers for the bootstrap messages for each electronic device. |
| messageBody[ ][ ] | This parameter may be a byte array containing the SMS message body for the bootstrap message for each electronic device. |

Some representative embodiments of the present invention provide an API function to be used by an OMA DM-based application to access DeviceCapability by the MMV of the electronic device. A function prototype for such a function may appear as follows:

public Collection getDeviceCapabilityByMMV(MMV mmv)

In a representative embodiment of the present invention, an OMA DM-based application may use this API function to cause the OMA DM common framework to provide Device-Capability information based on the MMV of an electronic device (e.g., the electronic device 107 of FIG. 1). The "getDeviceCapabilityByMMV" function may return the list of device capabilities.

Table 21, shown below, illustrates an exemplary set of parameters that may be used with the "getDeviceCapability" API function call.

TABLE 21

| Name | Description |
| --- | --- |
| mmv | This parameter may be the make, model and version of the electronic device. |

Some representative embodiments of the present invention provide an API function to be used by an OMA DM-based application to access DeviceCapability by the deviceId of the electronic device. A function prototype for such a function may appear as follows:

public Collection getDeviceCapability(String deviceID)

In a representative embodiment of the present invention, an OMA DM-based application may use this API function to cause the OMA DM common framework to provide Device-Capability information based on the deviceId of an electronic device (e.g., the electronic device 107 of FIG. 1). The "getDeviceCapability" function may return the list of device capabilities.

Table 22, shown below, illustrates an exemplary set of parameters that may be used with the "getDeviceCapability" API function call.

TABLE 22

| Name | Description |
| --- | --- |
| deviceID | This parameter may be the deviceID of the electronic device. |

Some representative embodiments of the present invention provide an API function to be used by an OMA DM-based application to create a new DeviceCapability for an electronic device. A function prototype for such a function may appear as follows:

public void createDeviceCapability (DeviceCapability deviceCapability)

In a representative embodiment of the present invention, an OMA DM-based application may use this API function to cause the OMA DM common framework to create a new DeviceCapability information.

Table 23, shown below, illustrates an exemplary set of parameters that may be used with the "createDeviceCapability" API function call.

TABLE 23

| Name | Description |
| --- | --- |
| deviceCapability | This parameter may be the deviceCapability that the OMA DM-based application wishes to create. |

Some representative embodiments of the present invention provide an API function to be used by an OMA DM-based application to assign a DeviceCapability to a single electronic device (e.g., electronic device 107 of FIG. 1). A function prototype for such a function may appear as follows:

public void assignDeviceCapability(DeviceInstance deviceInstance, DeviceCapability deviceCapability)

In a representative embodiment of the present invention, an OMA DM-based application may use this API function to assign DeviceCapability information a single electronic device (e.g., the electronic device 107 of FIG. 1).

Table 24, shown below, illustrates an exemplary set of parameters that may be used with the "getDeviceCapability" API function call.

TABLE 24

| Name | Description |
| --- | --- |
| deviceInstance | This parameter may be a single electronic device. |
| deviceCapability | This parameter may be the DeviceCapability that the OMA DM-based application wishes to assign to the electronic device. |

Some representative embodiments of the present invention provide an API function to be used by an OMA DM-based application to update DeviceCapability information for a single electronic device (e.g., electronic device 107 of FIG. 1). A function prototype for such a function may appear as follows:
   public void updateDeviceCapability(DeviceCapability deviceCapability)

In a representative embodiment of the present invention, an OMA DM-based application may use this API function to update DeviceCapability information for a single electronic device (e.g., the electronic device 107 of FIG. 1).

Table 25, shown below, illustrates an exemplary set of parameters that may be used with the "updateDeviceCapability" API function call.

TABLE 25

| Name | Description |
| --- | --- |
| deviceCapability | This parameter may be the DeviceCapability that the OMA DM-based application wishes to update. |

Some representative embodiments of the present invention provide an API function to be used by an OMA DM-based application to get the node URI for a single electronic device (e.g., electronic device 107 of FIG. 1). A function prototype for such a function may appear as follows:
   public String getNodeURI(String deviceId, String nodeType)

In a representative embodiment of the present invention, an OMA DM-based application may use this API function to get the node URI for a single electronic device (e.g., the electronic device 107 of FIG. 1).

Table 26, shown below, illustrates an exemplary set of parameters that may be used with the "getNodeURI" API function call.

TABLE 26

| Name | Description |
| --- | --- |
| deviceID | This parameter may be the device identifier of the electronic device. |
| nodeType | This parameter may be an identifier in the DM tree. By defining the nodeType in deviceCapability, the OMA DM-based application may share the DM tree information. |

Some representative embodiments of the present invention provide an API function to be used by an OMA DM-based application to add a device instance for an electronic device (e.g., electronic device 107 of FIG. 1) to an OMA DM common framework. A function prototype for such a function may appear as follows:
   public void addDevice (DeviceInstance deviceInstance)

In a representative embodiment of the present invention, an OMA DM-based application may use this API function to add a DeviceInstance object to an OMA DM common framework for an electronic device (e.g., the electronic device 107 of FIG. 1).

Table 27, shown below, illustrates an exemplary set of parameters that may be used with the "addDevice" API function call.

TABLE 27

| Name | Description |
| --- | --- |
| deviceInstance | This parameter may be the DeviceInstance object to be added to the OMA DM common framework. |

Some representative embodiments of the present invention provide an API function to be used by an OMA DM-based application to update a device instance for an electronic device (e.g., electronic device 107 of FIG. 1). A function prototype for such a function may appear as follows:
   public void updateDevice (DeviceInstance deviceInstance)

In a representative embodiment of the present invention, an OMA DM-based application may use this API function to update a DeviceInstance object in an OMA DM common framework for an electronic device (e.g., the electronic device 107 of FIG. 1).

Table 28, shown below, illustrates an exemplary set of parameters that may be used with the "addDevice" API function call.

TABLE 28

| Name | Description |
| --- | --- |
| deviceInstance | This parameter may be the DeviceInstance object to be added to the OMA DM common framework. |

Some representative embodiments of the present invention provide an API function to be used by an OMA DM-based application to get a device instance for an electronic device (e.g., electronic device 107 of FIG. 1). A function prototype for such a function may appear as follows:
   public void getDevice (DeviceInstance deviceInstance)

In a representative embodiment of the present invention, an OMA DM-based application may use this API function to get a DeviceInstance object for an electronic device (e.g., the electronic device 107 of FIG. 1) from an OMA DM common framework.

Table 29, shown below, illustrates an exemplary set of parameters that may be used with the "getDevice" API function call.

TABLE 29

| Name | Description |
| --- | --- |
| deviceID | This parameter may be the device ID identifying the electronic device for which the DeviceInstance object is to be gotten from the OMA DM common framework. |

Figure 5:
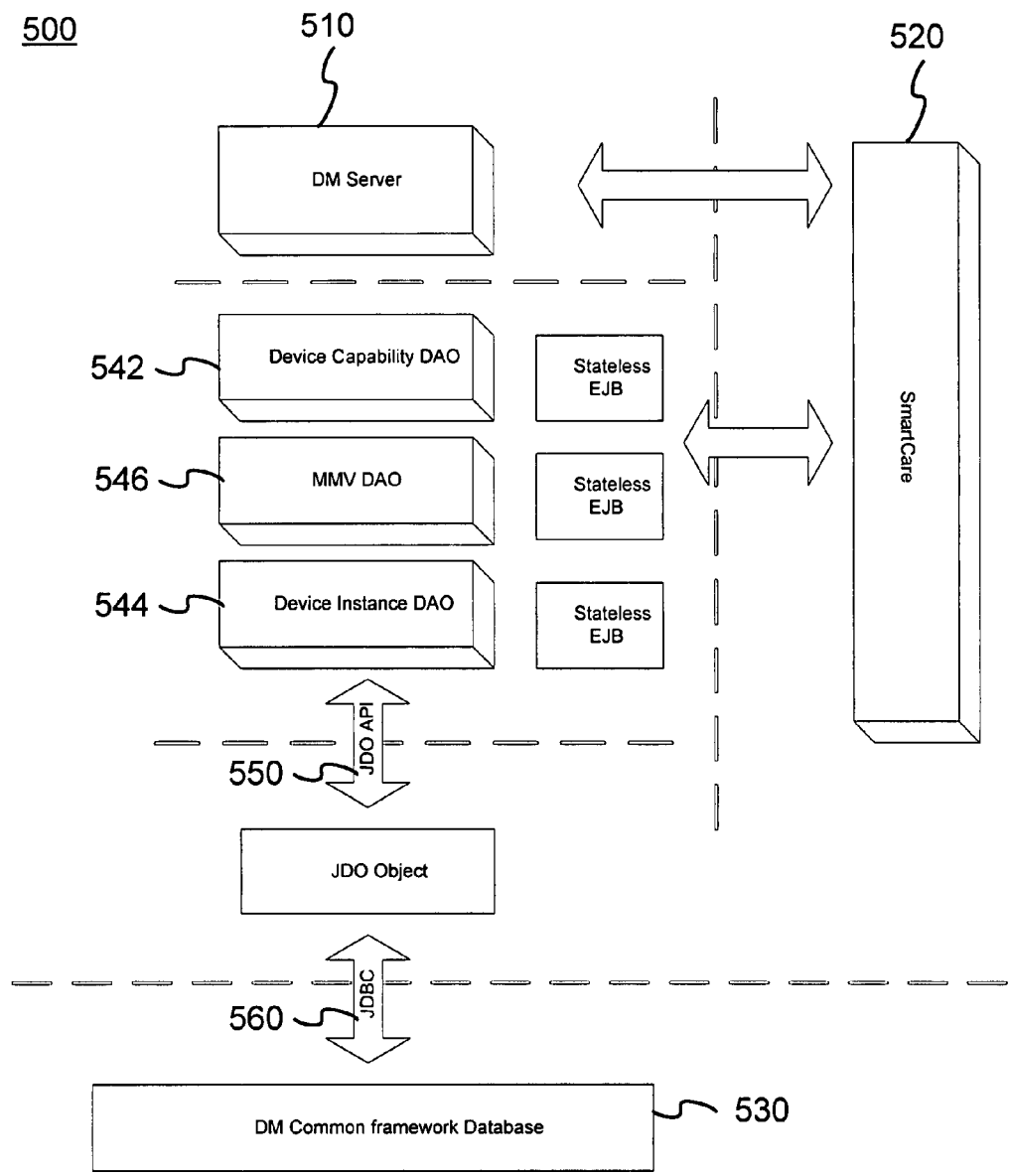
FIG. 5 shows the architecture of an exemplary device management system having an OMA DM common framework in accordance with a representative embodiment of the present invention.

FIG. 5 shows the architecture of an exemplary device management system 500 having an OMA DM common framework in accordance with a representative embodiment of the present invention. As shown in the example shown in the illustration of FIG. 5, OMA DM-based applications 520 employ an OMA DM common framework to manage Device Capability object 542, Device Instance object 544, and MMV object 546. The OMA DM-based applications 520 may comprise, for example, the SmartCare customer care application from Hewlett-Packard Company. The DM common framework may, for example, be implemented as a standalone Java Version 2 Enterprise Edition (J2ee) application, and may export its API by Remote Method Invocation (RMI) or web services, as described above. Access to the Device Capability object 542, Device Instance object 544, and MMV object 546 may be enabled by a stateless Enterprise Java Bean mechanism. The Device Capability object 542, Device Instance object 544, and MMV object 546 may employ a Java Data Objects (JDO) API 550 and Java Database Connectivity (JDBC) 560 to access a DM common framework database 530. Details of the functionality of the DM common framework database are not required of any of the OMA DM-based applications 520. In this manner, multiple OMA DM-based applications such as, for example, the OM DM-based applications 520 may simultaneously/concurrently access the DM common framework database 530, without knowledge of the access details or structure of the DM common framework database. In addition, access to the DM common framework database using an OMA DM common framework in accordance with a representative embodiment of the present invention permits OMA DM-based applications 520 to each "see" one set of objects used in device management of electronic devices (e.g., electronic device 107), providing consistent handling of the variety of data elements used.

The following describes an example device management activity to profile a sub-tree of a device management tree in an electronic device, node by node. In such a circumstance, a OMA DM-based application may issue the CommandRequest shown in Table 30, below:

TABLE 30

| Field | Value |
| --- | --- |
| command | GetStructData |
| targetURI[ ] | {./DevDetail?list=StructData} |
| | The ./DevDetail is the root node URI of the sub-tree |
| sourceURI | Null |
| value | Null |
| Format | Null |
| optIn | This field used to specify the notification UI mode in OMA DM specification |
| | 0 not-specified |
| | 1 background |
| | 2 informative |
| | 3 user-interaction |
| | Detail definition please refer to OMA-SyncML-DMNotification-V1__1__2-20031205-A.pdf |

An OMA DM common framework in accordance with one representative embodiment of the present invention converts the above object to a DM command and send it to the electronic device (e.g., electronic device 107 of FIG. 1). If the DM command status returned by the electronic device is, for example, "200", the profiling of the electronic device sub-tree was successful. The OMA DM common framework may return the results to the OMA DM-based application (e.g., an instance of the SmartCare customer care application). If the DM command status returned by electronic device is, for example, "406", the profiling of the electronic device failed, and may indicate that the electronic device doesn't support retrieval of the DM tree information.

An OMA DM common framework in accordance with one representative embodiment of the present invention uses the command and parameters shown below to determine whether profiling a sub-tree is supported by an electronic device. The targetURI attribute of the CommandRequest object may be set as follows:

targetURI=="./abc?list=structData"

In accordance with the OMA DM protocol, a DM server may use the Get command with a "targetURI" attribute to retrieve management tree information identified by the targetURI attribute. The Get command and the URI may have the following format:

GET<URI>?list=<attribute>

Table 31 shows exemplary values for the "attributes" values shown above:

TABLE 31

| Attribute Value | Description |
| --- | --- |
| Struct | The structure of a management tree is returned, without any data. |
| StructData | The structure of the management tree is returned, with the leaf nodes data. |

In accordance with the OMA DM protocol, if an electronic device doesn't support the DM command sent to it, the electronic device will return the status "406". When an OMA DM common framework in accordance with a representative embodiment of the present invention finds that the electronic device does not support retrieval of the DM tree information, the OMA DM common framework may send a DM Get command to the electronic device recursively, to profile the sub-tree node by node. When the profile of a sub-tree is complete, an OMA DM common framework may send the results back to the OMA DM-based application (e.g., the SmartCare customer care application) by calling the "setCommandsResults" call back service method implemented by the OMA DM-based application.

The following illustrates an example of the results of a DM sub-tree profile activity:

| Field | Value |
| --- | --- |
| Struct | The structure of a management tree is returned, without any data. |
| StructData | The structure of the management tree is returned, with the leaf nodes data. |
| Command | Get. |
| statusCode | 406: to indicate that the device not support retrieve DM tree information. OMA DM common framework profile the device node by node |
| | 200: to indicate that the device support retrieve DM tree information |
| uri[ ] | {"./DevDetail?list=StructData", |
| | "./DevDetail", |
| | "./DevDetail/LrgObj", |
| | "./DevDetail/HwV", |

-continued

| Field | Value |
|---|---|
| | "./DevDetail/SwV", |
| | "./DevDetail/FwV", |
| | "./DevDetail/OEM", |
| | "./DevDetail/DevTyp", |
| | "./DevDetail/URI", |
| | "./DevDetail/Bearer", |
| | "./DevDetail/URI/MaxSegLen", |
| | "./DevDetail/URI/MaxTotLen", |
| | "./DevDetail/URI/MaxDepth" |
| | } |
| value[ ] | {"", |
| | "", |
| | "true", |
| | "intel", |
| | "4.0", |
| | "1.0", |
| | "SyncML Initiative", |
| | "Windows workstation", |
| | "", |
| | "", |
| | "0", |
| | "0", |
| | "0" |
| | } |
| format[ ] | {"", |
| | "node", |
| | "true", |
| | "intel", |
| | "4.0", |
| | "1.0", |
| | "SyncML Initiative", |
| | "Windows workstation", |
| | "node", |
| | "node", |
| | "0", |
| | "0", |
| | "0" |
| | } |

A representative embodiment of the present invention supports an end-to-end Firmware-Over-the-Air (FOTA) update solution where a subscriber identity module (SIM) may be used to augment existing OMA DM and proprietor FOTA security. The SIM is employed as an authentication tool for FOTA update packages and provides an operator specific control point for rejecting update packages for updates that are not explicitly authorized via the SIM. In a representative embodiment of the present invention, update packages may be signed by, for example, a network system operator and may then be checked against a validation string, which is embedded during manufacturing in an operator-provided SIM. In some representative embodiments, an update packages may have a validation string added as a header to a binary file that constitutes the update package.

In a representative embodiment of the present invention, update packages may be transported to an electronic device (e.g., electronic device 107 of FIG. 1) through existing OMA-based mechanisms. Existing OMA security mechanisms may be in place to validate authenticity of a client (e.g., the DM client 163 or update agent 115 of FIG. 1) and server (e.g., DM server 109 or download server 151 of FIG. 1) as well as to validate integrity of each message exchange. After download of an update package to the electronic device is complete, and prior to installation, a handoff agent (e.g., hand-off module 121 of FIG. 1) may retrieve the validation string from the SIM and store the validation string to non-volatile (e.g., flash) memory 111 so as to make the string available to the update agent 115 for validation. The update agent 115 in the electronic device 107 may check the header within the update package header against this validation string. A device management applicant such a, for example, the MVP Server from Hewlett-Packard Company, may be used to manage and dispatch the update package data to electronic devices (e.g., cellular or mobile handsets) over a communication network.

A representative embodiment of the present invention may be employed in electronic device such as, for example, Motorola V635 and E1000 handsets. Subscriber identity module (SIM) cards such as those available from, for example, Gemplus SA, also known as Gemalto NV, may be used to secure FOTA updates. In a representative embodiment of the present invention, a SIM card may include special information about a system operator against which validation of an update package may be performed, to permit secure updates.

Figures 6A, 6B:
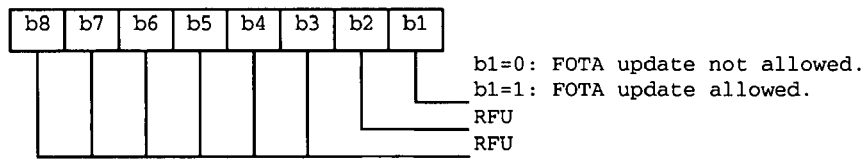
FIG. 6A shows an exemplary SIM file format for containing a set of FOTA credentials that may be stored in the file system of a SIM, in accordance with a representative embodiment of the present invention.
FIG. 6B shows an exemplary format of a FOTA condition byte that may correspond, for example, to the FOTA condition byte shown in FIG. 1, in accordance with a representative embodiment of the present invention.

FIG. 6A shows an exemplary SIM file format for containing a set of FOTA credentials that may be stored in the file system of a SIM, in accordance with a representative embodiment of the present invention. The file may, for example, be named EF_FOTA, and may have the format shown in FIG. 6A. In the example shown in FIG. 6A, the file is 17 bytes in size. A first byte "b1" may contain a FOTA condition flag that indicates whether the update process is allowed. The remaining 16 RFU bytes (2 through 17) may be used to hold the validation string or signature.

FIG. 6B shows an exemplary format of a FOTA condition byte that may correspond, for example, to the FOTA condition byte shown in FIG. 1, in accordance with a representative embodiment of the present invention. As shown in the example of FIG. 6B, a FOTA condition byte may use the rightmost or lowest order bit "b1" may take a value of "0", when FOTA update is not allowed, and a value of "1", when FOTA update is allowed.

Figure 7:
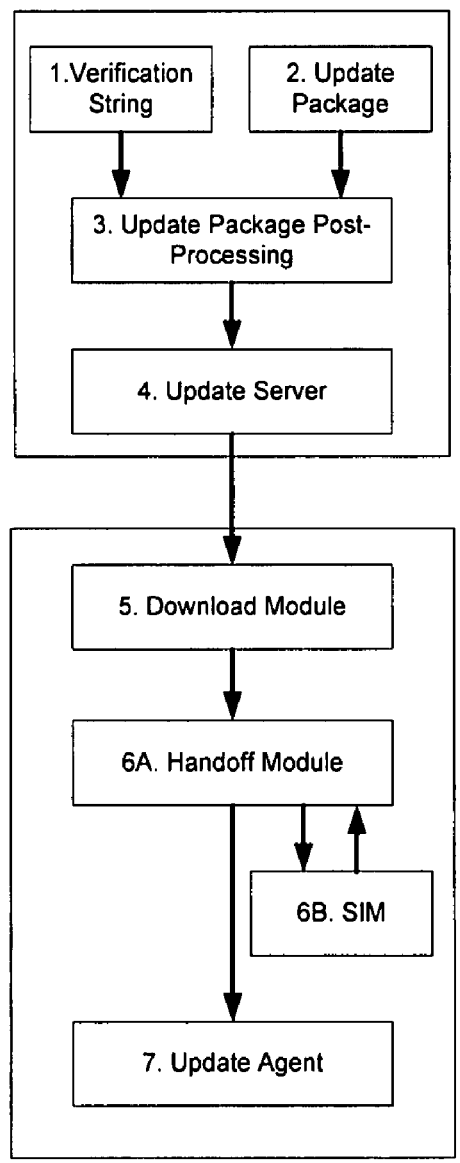
FIG. 7 shows a flowchart illustrating an exemplary process of signing an update package and verifying it against the signature/validation string stored on a SIM card, in accordance with a representative embodiment of the present invention.

FIG. 7 shows a flowchart illustrating an exemplary process of signing an update package and verifying it against the signature/validation string stored on a SIM card, in accordance with a representative embodiment of the present invention. In box 1, a verification string/validation string/signature may be provided by the vendor/manufacturer of the SIM cards in use. The verification string/validation string/signature may, for example, be programmed into the SIM cards during the manufacturing process. At box 2, the developer/creator of an update package may provide the update package for a given update. The verification string/validation string/signature may be unique to a particular system operator, but may not be unique to a subscriber/owner of the electronic device to be updated. At box 3, a post-processing activity may place the verification string/validation string/signature into the update package, readying it for secure distribution. Then, at box 4, the update package may be stored on an update server (e.g., download server 151 or DM server 109 of FIG. 1) for later distribution to compatible and identified electronic devices.

At some later time, a download module in an electronic device (e.g., electronic device 107 of FIG. 1) may download the update package from the update server. The downloaded update package may, for example, be stored in non-volatile memory (e.g., non-volatile memory 111 of FIG. 1). In a representative embodiment of the present invention, the download process may be allowed to begin only if the "FOTA update allowed" bit (e.g., bit "b1" of the FOTA condition byte of FIG. 6B) is set, and/or if the a FOTA file (e.g., EF_FOTA file mentioned above) exists on the SIM operably coupled to the electronic device. At box 6A, a handoff module (e.g., handoff module 121 of FIG. 1) may assist an update agent (e.g., update agent 115 of FIG. 1) to validate the update package by retrieving the verification string/validation string/signature stored in the EF_FOTA file of the SIM. As described previously, this information may, for example, be pre-installed in the SIM at time of manufacture. The verification string/validation string/signature from the SIM may then be written to non-volatile memory (e.g., flash memory) for retrieval by the update agent 115. Then, at box 7, the update agent 115 may validate the verification string/validation string/signature against the string contained in the header of the update package. The update package may be processed and the update process completed, if the verification string/validation string/signature is validated. The update process may be terminated, however, if validation of the verification string/validation string/signature fails.

FIG. 8 shows a table illustrating exemplary scenarios regarding the control of the update process for an electronic device that may correspond to, for example, the electronic device 107 of FIG. 1, for an update package secured by System Operator A and those not secured by System Operator A, used with a SIM issued by System Operator A, in accordance with a representative embodiment of the present invention.

In a representative embodiment of the present invention, the verification string/validation string/signature data may be stored in non-volatile memory (e.g., flash memory), and may share memory space with FOTA data. The EF_FOTA bytes may be stored at the end of blocks reserved for an update package. In some representative embodiments of the present invention, the EF_FOTA bytes may be part of flex data.

The update agent in one representative embodiment of the present invention extracts the verification string/validation string/signature data from an update package, and may compare it with the verification string/validation string/signature data extracted from the SIM and stored in non-volatile memory (e.g., flash memory). The update agent may identify the location of the verification string/validation string/signature data by including the appropriate addresses in memory where it is stored. This information may be part of an update agent header, and the update agent may accommodate the signature checking. The verification string/validation string/signature data extracted from a SIM by a handoff agent may be read, and may be compared with verification string/validation string/signature data signature data embedded in an update package. If the update package is rejected, an error code may be written to non-volatile memory as a return value.

In a representative embodiment of the present invention, an update agent such as, for example, the update agent 115 of FIG. 1, may perform the following functions in validating an update package:

The update agent may read the SIM verification string/validation string/signature data location in non-volatile (e.g., flash) memory, The update agent may shall read a FOTA header (e.g., a 17-byte header as shown in FIG. 6A) from a downloaded update package, The update agent may compare the SIM verification string/validation string/signature data to the update package FOTA header:

If the verification string/validation string/signature data match, the update agent may process the update package and install it in a fault-tolerant manner, If the verification string/validation string/signature data do not match, the update agent may reject the update package and terminate the update process. The update agent may return the electronic device (e.g., electronic device 107 of FIG. 1) to a normal operating condition and may reset any bytes used to start the update process.

The update agent may communicate error codes upon failure by storing this information within a handoff data area of non-volatile memory (e.g., non-volatile memory 111 of FIG. 1).

In a representative embodiment of the present invention, verification string/validation string/signature data may be added/attached to an update package created by, for example, an update package generator such as the mProve® Generator available from Hewlett-Packard Company. In some representative embodiments, sixteen (16) bytes may be added to the update package binary data. The process of adding/attaching the verification string/validation string/signature data may be done through a binary concatenation tool designed for this specific purpose.

In a representative embodiment of the present invention, software/firmware components within the electronic device may perform the following functions in handling an update package:

A download agent in the electronic device (e.g., DM client 163 of FIG. 1) may be responsible for the following:

Reading the verification string/validation string/signature data, EF_FOTA file, from a SIM card.

Implement the logic to proceed with download if update is allowed, otherwise abort.

Download the update package from the server.

Pass control to a handoff agent (e.g., handoff module 121 of FIG. 1).

A handoff agent in the electronic device (e.g., handoff module 121 of FIG. 1) may be responsible for the following:

Reading the verification string/validation string/signature data, EF_FOTA file, from the SIM card.

Implement logic to proceed with committing data to non-volatile memory if update is allowed, otherwise abort.

Store data to non-volatile memory (e.g., flash memory) according to the following sequence: 1) update package data, 2) verification string/validation string/signature data, 3) handoff data.

Pass control to an update agent, and reset the electronic device. The non-volatile memory (e.g., flash storage) location for the contents of the EF_FOTA file from the SIM may be accessible to the update agent.

The following discussion provides the details of exemplary use-cases illustrating various aspects of some representative embodiments of the present invention. A representative embodiment of the present invention provides a SIM secured FOTA mechanism that is designed to prevent users with electronic devices issued, provided, and maintained by a system operator from installing alternative update packages that are not explicitly approved by the system operator. The security method is transport independent, so that unapproved updates are rejected by the electronic device, regardless of how they are delivered.

The following exemplary use-case illustrates a case where a system operator A-approved update package is to be processed with a system operator A-secured FOTA SIM.

Pre-Condition:
1) Electronic device is operating on an older revision of firmware,
2) System operator SIM secured update package for newer firmware version is already published to an update server,
3) Electronic device is FOTA enabled with SIM security functionality,
4) System operator SIM with FOTA security credentials is being used,
5) Electronic device has been bootstrapped with DM credentials.

Post-Condition:
1) Electronic device is operating on newer revision of firmware

Steps:
1) Initiate update via update server by entering MSISDN,
2) Download agent checks for the update allowed condition (e.g., bit "b1" set in FOTA condition byte),
3) Electronic device downloads applicable update package,
4) Handoff agent retrieves FOTA credentials (e.g., verification string/validation string/signature data) from SIM and stores it to the non-volatile memory (e.g., flash memory), and triggers update agent,
5) Update agent validates the update package against SIM credentials (verification string/validation string/signature data) stored in non-volatile memory (e.g., flash memory),
6) Update agent installs approved update package,
7) Electronic device responds with success status.

The following exemplary use-case illustrates a case where a non-secured update package is to be processed with a system operator A-secured FOTA SIM.

Pre-Condition:
1) Electronic device is operating on an older revision of firmware,
2) Non-secured update package for newer firmware version is already published to the update server,
3) Electronic device is FOTA enabled with SIM security functionality,
4) System operator SIM with FOTA security credentials (verification string/validation string/signature data) is being used,
5) Electronic device has been bootstrapped with DM credentials.

Post-Condition:
1) Electronic device rejects new update package,
2) Electronic device is operating on older (original) revision of firmware.

Steps:
1) Initiate update via update server by entering MSISDN,
2) Download agent checks for the update allowed condition (e.g., bit "b1" set in FOTA condition byte),
3) Electronic device downloads applicable update package,
4) Handoff agent retrieves FOTA credentials (verification string/validation string/signature data) from SIM and stores it to the non-volatile memory (e.g., flash memory), and triggers update agent,
5) Update agent validates update package against SIM credentials (verification string/validation string/signature data) stored in non-volatile memory (e.g., flash memory),
6) Update agent rejects update package and terminates installation,
7) Update agent produces a "Failed" status and returns to normal operation.

The following exemplary use-case illustrates a case where a system operator B-secured update package is to be processed with a system operator A-secured FOTA SIM.

Pre-Condition:
1) Electronic device is operating on an older revision of firmware,
2) SIM secured update package from system operator B for newer firmware version is already published to the update server (Note: This may be an unlikely scenario, but may be used to test extent of security protection. Credentials (verification string/validation string/signature data) are assumed different for system operator B),
3) Electronic device is FOTA enabled with SIM security functionality,
4) System operator A SIM with FOTA security credentials is being used,
5) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte),
3) Electronic device downloads applicable update package,
4) Handoff agent retrieves FOTA credentials (verification string/validation string/signature data) from SIM and stores it to the non-volatile memory (e.g., flash memory), and triggers update agent,
5) Update agent validates update package against SIM credentials (verification string/validation string/signature data) stored in non-volatile memory (e.g. flash memory),
6) Update agent rejects update package and terminates installation,
7) Update agent produces a "Failed" status and returns to normal operation.

The following exemplary use-case illustrates a case where a system operator B-approved update package is to be processed with a system operator A-not secured FOTA SIM.

Pre-Condition:
8) Electronic device is operating on an older revision of firmware,
9) System operator A SIM secured update package for newer firmware version is already published to the update server,
10) Electronic device is FOTA enabled without SIM security functionality,
11) System operator A SIM without FOTA security credentials is being used,
12) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte) and/or EF_FOTA file presence on the SIM,
3) If EF_FOTA file does not exist, download agent aborts update session,
4) Download agent check for the update allowed condition (e.g., bit "b1" set in FOTA condition byte),
5) Download agent retrieves FOTA credentials (verification string/validation string/signature data) from SIM and stores it to the non-volatile memory (e.g., flash memory),
6) Electronic device downloads applicable update package and triggers update agent, 7) Update agent validates update package header against SIM credentials (verification string/validation string/signature data stored in non-volatile memory (e.g., flash memory),
8) Update agent rejects update package and terminates installation,
9) Update agent produces a "Failed" status and returns to normal operation.

The following exemplary use-case illustrates a case where a non-secured update package is to be processed with a system operator A-not secured FOTA SIM.

Pre-Condition:
1) Electronic device is operating on an older revision of firmware,
2) Non-secured update package for newer firmware version is already published to the update server,
3) Electronic device is FOTA enabled without SIM security functionality,
4) System operator A SIM without FOTA security credentials is being used,
5) Electronic device has been bootstrapped with DM credentials.

Post-Condition:
1) Electronic device rejects new update,
2) Electronic device is operating on older (original) revision of firmware, Steps:
1) Initiate update via update server by entering MSISDN,
2) Download agent checks for the update allowed condition (e.g., bit "b1" set in FOTA condition byte) and/or EF_FOTA file presence on the SIM,
3) If EF_FOTA file does not exist, download agent aborts update session,
4) Download agent checks for the update allowed condition (e.g., bit "b1" set in FOTA condition byte),
5) Download agent retrieves FOTA credentials (verification string/validation string/signature data) from SIM and stores it to the non-volatile memory (e.g., flash memory),
6) Electronic device downloads applicable update package and triggers update agent,
7) Update agent validates update package header against SIM credentials (verification string/validation string/signature data) stored in non-volatile memory (e.g., flash memory),
8) Update agent rejects update package and terminates installation,
9) Update agent produces a "Failed" status and returns to normal operation.

The following exemplary use-case illustrates a case where a non-system operator B-secured update package is to be processed with a system operator A-not secured FOTA SIM.

Pre-Condition:
1) Electronic device is operating on an older revision of firmware,
2) SIM Secured Update Package from system operator B for newer firmware version is already published to the update server (Note: This may be an unlikely scenario, but may be used to test extent of security protection. Credentials (verification string/validation string/signature data) are assumed different for system operator B),
3) Electronic device is FOTA enabled without SIM security functionality
4) System operator A SIM without FOTA security credentials is being used,
5) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte) and/or EF_FOTA file presence on the SIM,
3) If EF_FOTA file does not exist, download agent aborts update session,
4) Download agent checks for the update allowed condition (e.g., bit "b1" set in FOTA condition byte),
5) Download agent retrieves FOTA credentials (verification string/validation string/signature data) from SIM and stores it to the non-volatile memory (e.g., flash memory),
6) Electronic device downloads applicable update package and triggers update agent,
7) Update agent validates update package header against SIM credentials (verification string/validation string/signature data) stored in non-volatile memory (e.g., flash memory),
8) Update agent rejects update package and terminates installation,
9) Update agent produces a "Failed" status and returns to normal operation.

The following exemplary use-case illustrates a case where a system operator A-approved update package is to be processed with a system operator A-secured FOTA SIM and FOTA update is not allowed (e.g., bit "b1" of FOTA condition byte=0).

Pre-Condition:
1) Electronic device is operating on an older revision of firmware,
2) System operator A SIM secured update package for newer firmware version is already published to the update server,
3) Electronic device is FOTA enabled with SIM security functionality,
4) System operator A SIM with FOTA security credentials (verification string/validation string/signature data) but FOTA Update Not Allowed is being used,
5) Electronic device has been bootstrapped with DM credentials.

Post-Condition:
1) Electronic device rejects new update,
2) Electronic device is operating on older (original) revision of firmware.

Steps:
1) Initiate update via update server by entering MSISDN,
2) Download agent checks for the update allowed condition (e.g., bit "b1" set in FOTA condition byte),
3) Download agent retrieves FOTA credentials (verification string/validation string/signature data) from SIM and stores it to the non-volatile memory (e.g., flash memory),
4) Electronic device downloads applicable update package and triggers update agent,
5) Update agent validates update package header against SIM credentials (verification string/validation string/signature data) stored in non-volatile memory (e.g., flash memory),
6) Update agent rejects update package and terminates installation,
7) Update agent produces a "Failed" status and returns to normal operation.

An update server in one representative embodiment of the present invention supports Operator specific prompting. Language preference may be passed as a field in a form that may be manually filled in by customer on web interface, or that may be passed as a URL parameter such as, for example, automatically passed by customer care agent application or by Operator Mobile portal. Region specific languages may be supported in a download descriptor portion of metadata that is associated with an update package. In order to support multiple languages, one representative embodiment of the present invention permits multiple download descriptors to be associated with each update package.

Some representative embodiments of the present invention support management (e.g., creation, deletion, modification, selection, and listing) of device tester groups. Specific software/firmware updates may be selectively published to specific groups of subscribers. Deployment managers may select available 'Released' updates and assign them to managed subscriber groups, or classes. This feature enables global operators to centrally test and validate updates while providing the flexibility of independent deployments for each geographic or operating unit. For example, an update may be only made available to a specific device testing group who have a software/firmware version of 2.x or higher because of certain electronic device (e.g., hardware limitations).

Figure 9:
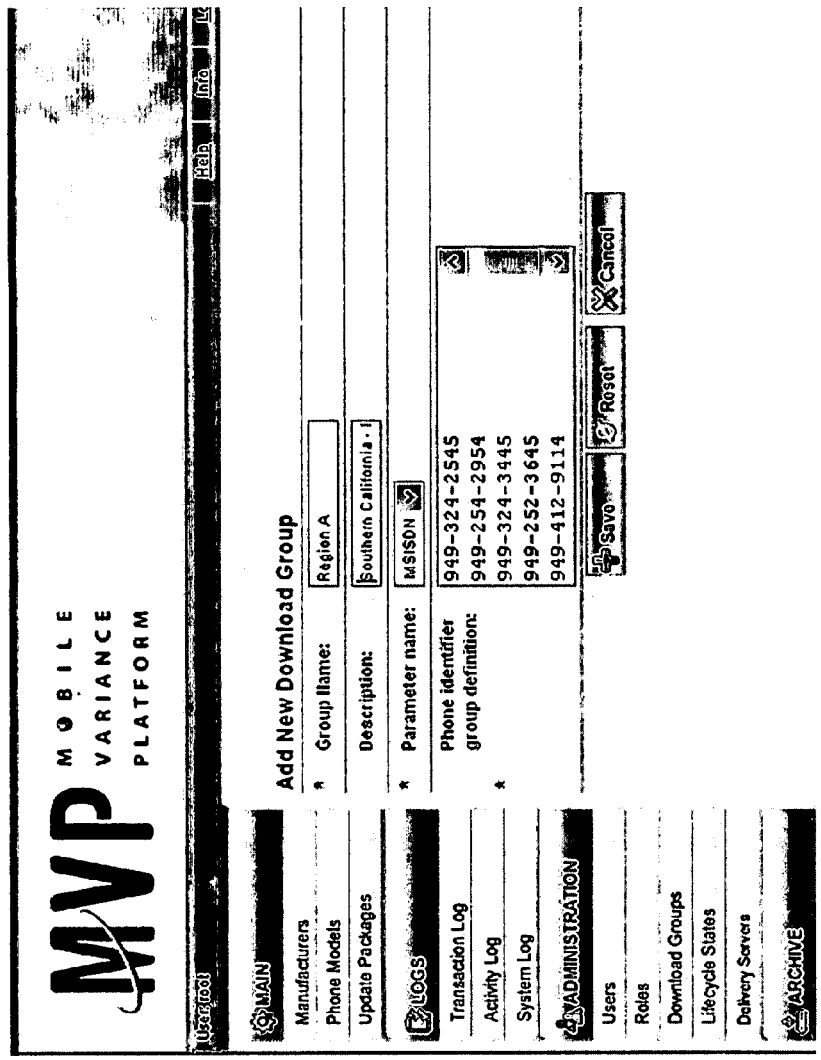
FIG. 9 shows an illustration of an exemplary user interface screen that enables creation of download groups, in accordance with a representative embodiment of the present invention.

FIG. 9 shows an illustration of an exemplary user interface screen 900 that enables creation of download groups, in accordance with a representative embodiment of the present invention. As shown in FIG. 9, Some representative embodiments of the present invention permit the definition of a named download group of subscribers identified by, for example, the telephone number of each member of the download group. Such downloads groups may permit a subset of the subscriber base to be provided with particular versions of software/firmware that is not made available for distribution to the remaining subscribers of a system operator. This may, for example, permit special versions of, firmware and software applications to be provided to special subscriber groups that have use for the features of such special versions, or to provide pre-release or "beta" versions of electronic device applications to be tested by controlled groups of users. Some representative embodiments of the present invention support the creation, deletion, and modification of special groups of subscribers. Some representative embodiments of the present invention also support the generation and exporting of statistics and reports related to special groups of subscribers.

Some representative embodiments of the present invention provide support for the distribution of multiple update packages in a single session of communication of an update server with an electronic device. During a rendezvous with the device, an update server in accordance with the present invention may determine that multiple updates are involved, and may accordingly fetch the relevant update packages and initiate multiple downloads to the affected electronic device. In a representative embodiment of the downloads may be initiated in the same device management session.

In some representative embodiments of the present invention, an update server may check whether further update packages are available for download, and if so, may initiate an OMA DM Replace/Exec command for a remaining update package, immediately. This may result in a daisy chain of updates, where the electronic device is updated until brought to the latest firmware/software version. Some representative embodiments of the present invention employ device-specific adapters that enable customization such as update with multiple update packages.

Some representative embodiments of the present invention support text prompting before a download of update package information. The language of such text prompts may be selected based upon the MSISDN of the electronic device to be updated. For example, one of English, German, French and Spanish may be selected depending upon the MSISDN of the electronic device to be updated. This may be supported for text prompting before both individual updates and bulk updates.

Some representative embodiments of the present invention support text prompting after a download of update package information. The language of such text prompts may be selected based upon the MSISDN of the electronic device to be updated. For example, one of English, German, French and Spanish may be selected depending upon the MSISDN of the electronic device to be updated. This may be supported for text prompting after both individual updates and bulk updates.

In a representative embodiment of the present invention, such text prompts may be picked out of a download descriptor associated with the update package to be downloaded to the electronic device. The electronic device may receive the download descriptor, extract the text prompt information, and display it to the user of the electronic device. The download descriptor may be, for example, a download descriptor such as the OMA download descriptor. The text prompt in the download descriptor may, for example, be automatically populated from release notes maintained in an update server system.

Some representative embodiments of the present invention support text prompting after download and before proceeding with an update of an electronic device. The language of such text prompts may be selected based upon the MSISDN of the electronic device to be updated. For example, one of English, German, French and Spanish may be selected depending upon the MSISDN of the electronic device to be updated. Such text prompts may be specified by a customer care representative. This feature may be supported for text prompting before updating of an electronic device for both individual updates and bulk updates.

Some representative embodiments of the present invention support text prompting after an update of an electronic device. The language of such text prompts may be selected based upon the MSISDN of the electronic device to be updated. For example, one of English, German, French and Spanish may be selected depending upon the MSISDN of the electronic device to be updated. Such text prompts may be specified by a customer care representative. This feature may be supported for text prompting after updating of an electronic device for both individual updates and bulk updates.

Some representative embodiments of the present invention support administrator creation and configuration of roles of different users of an update server. This configuration may include the setting of functional restrictions and user interface configuration for each user role. Configuration of the user interface for a particular user role may include the selection of the information fields available on the user interface for that role, and read/write access permissions to the information available for the role. This permits the update server administrator to streamline processes and minimize the chances of overloading a user of the system with excessive and/or meaningless information.

An update server in accordance with one representative embodiment of the present invention supports the generation of reports for specific device target groups. This report may be generated based upon, for example, MSISDN. Reports showing historical transactions for a single electronic device may be provided. Such a report may, for example, be generated for a specific electronic device, and may be viewed and exported.

Figure 10:
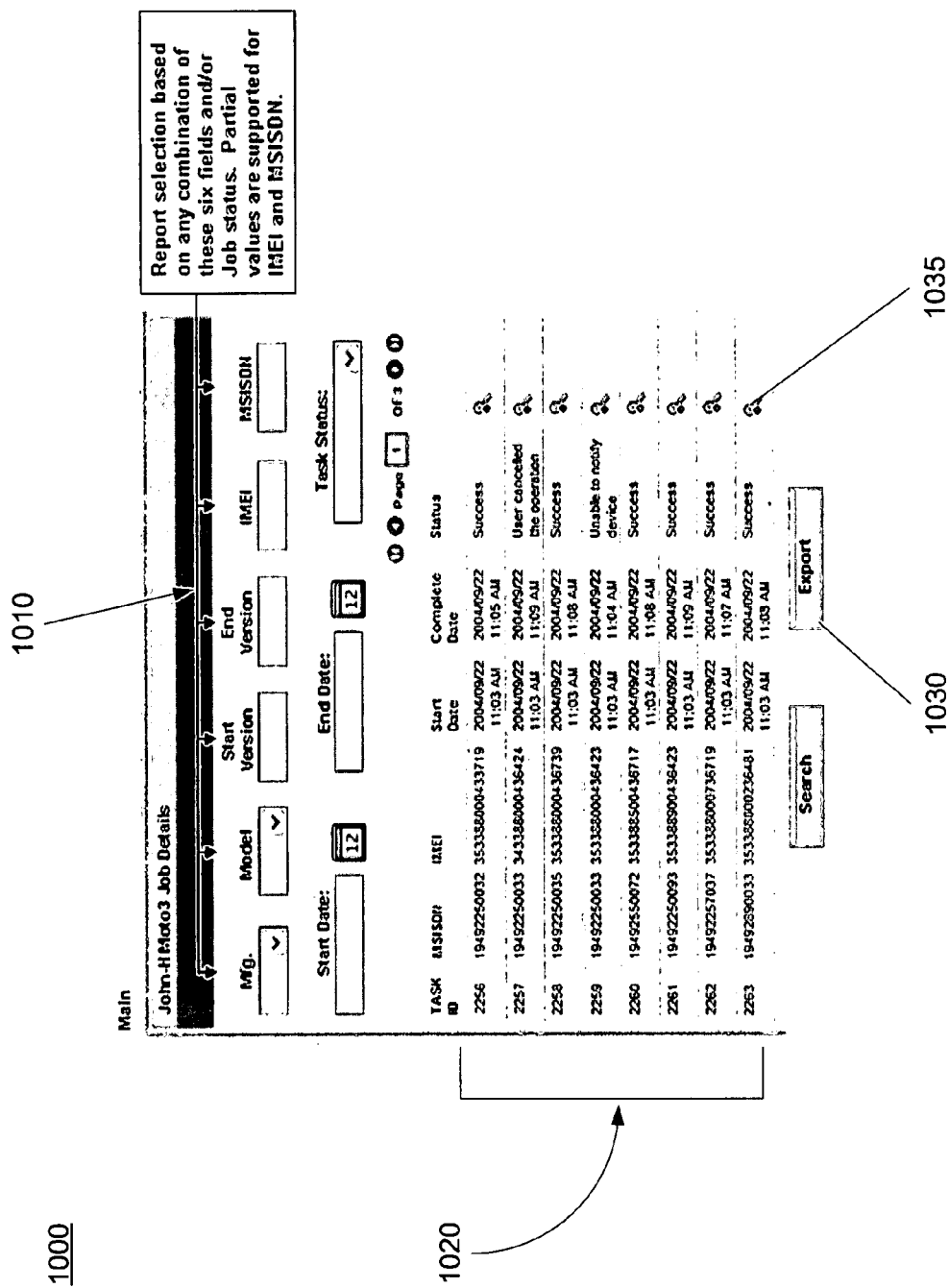
FIG. 10 illustrates a exemplary job details screen that may be employed by a user of an update server during management of updates to multiple electronic devices that may correspond to, for example, the electronic device of FIG. 1, in accordance with a representative embodiment of the present invention.

FIG. 10 illustrates a exemplary job details screen 1000 that may be employed by a user of an update server during management of updates to multiple electronic devices that may correspond to, for example, the electronic device 107 of FIG. 1, in accordance with a representative embodiment of the present invention. As shown in the example illustrated in FIG. 10, query controls 1010 allow a user to filter the report by manufacturer, model, version, IMEI (or partial IMEI), MSISDN (or partial MSISDN), start date, end date, and task status. An export button 1030 allows the filtered report to be exported to a command separated values (CSV) file. Clicking on a view icon 1035 may bring up a task detail report, showing events that have occurred for the selected electronic device.

Further detail may be provided for each job indicating each electronic device and the state for that electronic device. These results may be filtered by a number of parameters to provide results for a specific group of electronic devices (e.g., handsets). For example, one might specify all failed updates for an electronic device such as a Nokia 3560. These reports may be exportable for offline analysis or for re-submission after problem resolution.

FIG. 11 illustrates an exemplary event level details screen 1100, in accordance with a representative embodiment of the present invention.

To help with troubleshooting for specific devices, an update server/download server may provide event level detail for each step of the update process. An internal state machine design may enable an operator to understand where in the process a problem is occurring to pinpoint the exact point of failure.

Some representative embodiments of the present invention support listing of available update packages, including those that may require special handling such as those that have been "created", "rejected", "tested" and "deactivated". Filters may be provided that permit filtering list contents by manufacturer and model, for example. Filtering by update package state may also be provided.

Some representative embodiments of the present invention support a monitoring mechanism to provide warning conditions when a configurable failure threshold is met. One representative embodiment of the present invention may use SNMP traps programmatically. Another representative embodiment of the present invention may employ monitoring threads that watch for failed jobs and send email or an SNMP trap when a threshold level is read. A representative embodiment of the present invention allows a user to allocate monitoring parameters (e.g., for warning conditions). An update task may be given a threshold level for minimum successful updates within a given time period (e.g., set manually by appropriate user role). This threshold level may be modified at any time. The update task may also be given a threshold level for a maximum number of failed updates within a given time period (e.g., set manually by appropriate user role). This threshold level may also be modified at any time. Some representative embodiments of the present invention also automatically suspend an update task if special conditions are met.

Some representative embodiments of the present invention permit update task (re-)scheduling at any time. For example, such an embodiment may allow an authorized user to allocate and/or modify the (re-)start week, day and time; to allocate and/or modify the authorized week, day and time periods; to allocate and/or modify the non-authorized week, day and time periods; to allocate and/or modify the priority level. Such an embodiment may also allow an authorized user to allocate and/or modify the maximum number of download attempts with a device; to allocate and/or modify the restrictions on network(s) that can be used for the electronic device update; to allocate and/or modify the threshold level for minimum successful updates within a given time period; and to allocate and/or modify the threshold level for maximum failed updates within a given time period. Restart parameters and priority levels may involve stopping of a job, exporting outstanding records, re-importing of records and restarting under a new job. A warning that a minimum threshold level has not been met may also be provided. A warning that maximum thresholds are surpassed may be provided. A means of determining the meaning or description of standard and/or manufacturer-specific result/error codes may be provided, and details of the meanings/descriptions of such result/error codes may be placed on exported reports.

Some representative embodiments of the present invention comprise an update server for the generation and distribution of update packages. Update packages generated by such an update server may include the FOTA credentials (verification string/validation string/signature data) discussed previously, or the FOTA credentials (verification string/validation string/signature data) may be added to an update package using a post-processing tool, discussed earlier in this document.

Aspects of the present invention may be seen in a system supporting access via a communication network to device management information for a plurality of electronic devices. Such a system may comprise at least one database containing the device management information, the at least one database enabling access to the device management information using a first object-type software interface mechanism. Such a system may also comprise at least one device management server communicatively coupled to the plurality of electronic devices and to the at least one database, the at least one device management server employing a second object-type software interface mechanism to access the at least one database. In addition, such a system may comprise a plurality of application servers, each of the plurality of application servers employing the second object-type software interface mechanism to access the at least one database in parallel with access by the at least one device management server.

In a representative embodiment of the present invention, the at least one database may comprise one or more management objects specified by an Open Mobile Alliance (OMA) version 1.2 or earlier protocol specification. The first object-type software interface mechanism may comprise a java data objects interface, and the second object-type software interface mechanism may comprise a data access object (DAO) interface. The second object-type software interface mechanism may support one or more of a device capability object, a device instance object, and an object for managing information identifying one or more of a make, a model and/or a version of each of the plurality of electronic devices. The communication network may comprise a public wireless network, and the plurality of electronic devices may comprise a cellular handset. The plurality of application servers may comprise one or both of a server providing customer care services to users of the plurality of electronic devices and/or a server that provides firmware and/or software updates to the plurality of electronic devices. The at least one device management server may access memory of the plurality of electronic devices using device management commands compatible with an Open Mobile Alliance (OMA) device management (DM) version 1.2 or earlier protocol specification.

Further aspects of the present invention may be observed in an electronic device comprising at least one processor operable to communicate over a network, and non-volatile memory operably coupled to the at least one processor. The non-volatile memory may comprise code executable by the at least one processor to receive and process information for updating firmware and/or software in the electronic device. Such an electronic device may also comprise interface circuitry for operably coupling the at least one processor to a user interchangeable circuit card. The executable code may cause at least a portion of the information for updating firmware and/or software to be compared to a corresponding portion of information in the user interchangeable circuit card to determine whether processing of information for updating firmware and/or software stored in the non-volatile memory of the electronic device is allowed.

In a representative embodiment of the present invention, the network comprises a public wireless network, and the electronic device may comprise a cellular handset. The information for updating firmware and/or software in the electronic device may comprise a set of instructions executable by the code to transform a first version of firmware and/or software to an updated version, and the user interchangeable circuit card may comprise a subscriber identity module (SIM) card.

Additional aspects of the present invention may be found in a system supporting device management via a communication network for a plurality of electronic devices. Such a system may comprise at least one database comprising information for updating the plurality of electronic devices, and information identifying each of the plurality of electronic devices, and at least one server communicatively coupled to the plurality of electronic devices and to the at least one database. In such a system, the at least one server may automatically determine a language for use in communicating at least one prompt message to a user of one of the plurality of electronic devices based upon the information identifying the one of the plurality of electronic devices. The at least one prompt message may be displayed upon receipt of a download descriptor compatible with an Open Mobile Alliance (OMA) version 1.2 or earlier protocol specification. The communication network may comprise a wireless network, and the information identifying each of the plurality of electronic devices may comprise one of a mobile station integrated services digital network (MSISDN) number, information identifying a public land mobile network (PLMN), a device identifier, or a phone number. The plurality of electronic devices may comprise a cellular handset, and the at least one server may communicate the information for updating the plurality of electronic devices using device management commands compatible with an Open Mobile Alliance (OMA) device management (DM) version 1.2 or earlier protocol specification.

Still other aspects of the present invention may be seen in a method supporting device management for a plurality of electronic devices, via a communication network. Such a method may comprise accessing at least one database comprising information for updating the plurality of electronic devices, and information identifying each of the plurality of electronic devices, and automatically determining a language for use in communicating at least one prompt message to a user of one of the plurality of electronic devices, based upon the information identifying the one of the plurality of electronic devices. The method may also communicate the at least one prompt message to the user of the one of the plurality of electronic devices, wherein the communicating may comprise expressing the at least one prompt in the determined language.

In a representative embodiment of the present invention, the at least one prompt message may be displayed upon receipt of a download descriptor compatible with an Open Mobile Alliance (OMA) version 1.2 or earlier protocol specification, and the communication network comprises a wireless network. The information identifying each of the plurality of electronic devices may comprise one of a mobile station integrated services digital network (MSISDN) number, information identifying a public land mobile network (PLMN), a device identifier, or a phone number, and the plurality of electronic devices may comprise a handset. The information for updating the plurality of electronic devices may be communicated to the plurality of electronic devices using device management commands compatible with an Open Mobile Alliance (OMA) device management (DM) version 1.2 or earlier protocol specification.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, a representative embodiment of the present invention may be realized in hardware, software, or a combination of hardware and software. Representative embodiments of the present invention may be realized in a centralized fashion in at least one computer system, or in a distributed fashion where different elements are spread across several interconnected computer systems. Any kind of computer system or other apparatus adapted for carrying out the methods described herein is suited. A combination of hardware and software may be a general-purpose computer system with a computer program that, when being loaded and executed, controls the computer system such that it carries out the methods described herein.

A representative embodiment of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation or material to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. A system supporting device management via a communication network for a plurality of electronic devices, the system comprising:
at least one database including memory comprising information for updating the plurality of electronic devices, and information identifying each of the plurality of electronic devices, wherein the information identifying the plurality of devices includes a device identifier and a language preference for use in communicating to the plurality of devices, and wherein the device identifier includes at least one of a mobile station integrated services digital network (MSISDN) number and a public land mobile network (PLMN) identifier;

at least one server communicatively coupled to the plurality of electronic devices and to the at least one database;

wherein the at least one server includes instructions stored in memory and executed by a processor to automatically determine a language for use in communicating at least one prompt message to a user of one of the plurality of electronic devices, based upon a device identifier and a language preference in the information identifying the one of the plurality of electronic devices; and wherein the communicating causes the one of the plurality of electronic devices to express the at least one prompt in the determined language.

2. The system according to claim 1, wherein the at least one prompt message is displayed upon receipt of a download descriptor compatible with an Open Mobile Alliance (OMA) version 1.2 or earlier protocol specification.

3. The system according to claim 1, wherein the communication network comprises a wireless network.

4. The system according to claim 1, wherein the plurality of electronic devices comprises a handset.

5. The system according to claim 1, wherein the at least one server communicates the information for updating the plurality of electronic devices using device management commands compatible with an Open Mobile Alliance (OMA) device management (DM) version 1.2 or earlier protocol specification.

6. A method supporting device management for a plurality of electronic devices, via a communication network, the method comprising:

accessing at least one database including memory comprising information for updating the plurality of electronic devices, and information identifying each of the plurality of electronic devices, wherein the information identifying the plurality of devices includes a device identifier and a language preference for use in communicating to the plurality of devices, and wherein the device identifier includes at least one of a mobile station integrated services digital network (MSISDN) number and a public land mobile network (PLMN) identifier;

automatically determining a language for use in communicating at least one prompt message to a user of one of the plurality of electronic devices, based upon a device identifier and a language preference in the information identifying the one of the plurality of electronic devices; and communicating the at least one prompt message to the user of the one of the plurality of electronic devices, wherein the communicating comprises causing the one of the plurality of electronic devices to express the at least one prompt in the determined language.

7. The method according to claim 6, wherein the at least one prompt message is displayed upon receipt of a download descriptor compatible with an Open Mobile Alliance (OMA) version 1.2 or earlier protocol specification.

8. The method according to claim 6, wherein the communication network comprises a wireless network.

9. The method according to claim 6, wherein the plurality of electronic devices comprises a handset.

10. The method according to claim 6, wherein the information for updating the plurality of electronic devices is communicated to the plurality of electronic devices using device management commands compatible with an Open Mobile Alliance (OMA) device management (DM) version 1.2 or earlier protocol specification.

* * * * *